United States Patent
Chen et al.

(10) Patent No.: US 11,509,508 B2
(45) Date of Patent: Nov. 22, 2022

(54) SCRAMBLING SEQUENCES AND SIGNALING INDICATIONS THEREOF

(71) Applicant: QUALCOMM Incorporated, San Diego, CA (US)

(72) Inventors: Jialing Li Chen, San Diego, CA (US); Bin Tian, San Diego, CA (US); Lin Yang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 12 days.

(21) Appl. No.: 17/176,517

(22) Filed: Feb. 16, 2021

(65) Prior Publication Data

US 2021/0266204 A1 Aug. 26, 2021

Related U.S. Application Data

(60) Provisional application No. 62/981,529, filed on Feb. 25, 2020.

(51) Int. Cl.
*H04L 25/03* (2006.01)

(52) U.S. Cl.
CPC .............................. *H04L 25/03866* (2013.01)

(58) Field of Classification Search
CPC .................................................. H04L 25/03866
See application file for complete search history.

(56) References Cited

U.S. PATENT DOCUMENTS

| 9,455,857 | B2 | 9/2016 | Choi et al. |
| 2017/0332277 | A1* | 11/2017 | Xin ....................... H04W 28/06 |
| 2020/0137759 | A1 | 4/2020 | Li et al. |

FOREIGN PATENT DOCUMENTS

WO  WO-2004006509 A1  1/2004

OTHER PUBLICATIONS

Huang, et al., (Panasonic): "Discussion on EHT PPDU formats", IEEE Draft; 11-20-0031-02-00BE-CONSIDERATIONS-ON-EHT-PPDU-FORMATS, IEEE-SA Mentor, Piscataway, NJ USA, vol. 802.11 EHT; 802.11be, No. 2 Jan. 16, 2020 (Jan. 16, 2020), pp. 1-11 (Year: 2020).*

(Continued)

*Primary Examiner* — Natasha W Cosme
(74) *Attorney, Agent, or Firm* — Holland & Hart LLP

(57) ABSTRACT

This disclosure provides systems, methods, and apparatuses for wireless communication that can be used to reduce the peak-to-average power ratio (PAPR) of data transmissions by increasing the degree of randomness with which data is scrambled for transmission over a wireless medium. In some implementations, a transmitting device may determine a set of scrambling initialization bits, and may generate a scrambling sequence based on the set of scrambling initialization bits and an $11^{th}$-order polynomial. The transmitting device may provide an indication of the set of scrambling initialization bits in a physical layer convergence protocol (PLCP) protocol data unit (PPDU). The transmitting device may scramble one or more portions of the PPDU based on the scrambling sequence. The transmitting device may transmit the PPDU over a wireless medium. In some instances, the set of scrambling initialization bits consists of 11 bits, and may be included in a Service field of the PPDU.

30 Claims, 12 Drawing Sheets

(56) References Cited

OTHER PUBLICATIONS

Chen X., (Intel), et al., "EHT PPDU Scrambler", IEEE Draft; 11-20-0563-00-00BE-EHT-PPDU-Scrambler, IEEE 802.11-20/0563r0, IEEE-SA Mentor, Piscataway, NJ, USA, vol. 802.11 EHT; 802.11be, Mar. 25, 2020 (Mar. 25, 2020), pp. 1-13, Apr. 9, 2020 (Apr. 9, 2020), XP068167437, Retrieved from the Internet: URL: https://mentor.ieee.org/802.11/dcn/20/11-20-0563-00-00be-eht-ppdu-scrambler.pptx [retrieved on Apr. 9, 2020] p. 3-p. 5, pp. 8,12,13.

"Fast Access to Subscriber Terminals (G.fast)—Physical Layer Specification: Corrigendum 2;G-9701", ITU-T Draft; Study Period 2017-2020; Study Group 15; Series G-9701, International Telecommunication Union, Geneva; CH, vol. 4/15, Feb. 20, 2020 (Feb. 20, 2020), pp. 1-541, XP044286507, Retrieved from the Internet: URL: https://www.itu.int/ifa/t/2017/sg15/exchange/wp1/q4/AAP/200207/G-9701-Cor2/G-9701-Cor2-LC.pdf [retrieved on Feb. 20, 2020] Section 10.2.2.4; figures 10-15.

International Search Report and Written Opinion—PCT/US2021/018302—ISA/EPO—dated May 14, 2021.

Klein J., (Ensemble Communications), et al., "HA-PHY-Scrambling", ETSI EP BRAN 24.5, IEEE Draft; BRAN24_5D042 (HA-Scrambling, Ensemble, Ericsson, Marconi & Nokia), IEEE-SA, Piscataway, NJ, USA, vol. 802.11 ETSI BRAN, Sophia-Antipolis, France, Aug. 21, 2001-Aug. 24, 2001, pp. 1-2, Sep. 12, 2002 (Sep. 12, 2002), XP068135018, Retrieved from the Internet: URL: http://www.ieee802.org/11/private/ETSI_documents/BRAN.bak/Docfile/BRAN18-28/BRAN24_5/BRAN24_5d042 (HA-Scrambling, Ensemble, Ericsson, Marconi & Nokia).doc [retrieved on Sep. 12, 2002] the whole document.

Liu C., (Huawei), et al., "Considerations on the Scrambler Design for 11be", IEEE Draft; 11-20-0686-00-00BE-CONSIDERATIONS-ON-THE-SCRAMBLER-DESIGN-FOR-11BE, IEEE 802.11-20/0686r0, IEEE-SA Mentor, Piscataway, NJ, USA, vol. 802.11 EHT; 802.11be, Apr. 28, 2020, pp. 1-19, May 1, 2020 (May 1, 2020), XP068167720, Retrieved from the Internet: URL: https://mentor.ieee.org/802.11/dcn/20/11-20-0686-00-00be-considerations-on-the-scrambler-design-for-11be.pptx [retrieved on May 1, 2020] p. 4-p. 9, p. 12.

Yang L., et al., "Remaining Issues with New 11 be Scrambler Date: Jul. 21, 2020 Authors: Name Affiliations Address Phone Email Background", IEEE 802.11-20/1107r0, pp. 1-7, Jul. 21, 2020 (Jul. 21, 2020), XP055801297, Retrieved from the Internet: URL: https://mentor.ieee.org/802.11/dcn/20/11-20-1107-00-00be-remaining-issues-with-new-11be-scrambler.pptx [retrieved on May 4, 2021] the whole document.

\* cited by examiner

SCRAMBLING SEQUENCES AND SIGNALING INDICATIONS THEREOF

CROSS-REFERENCE TO RELATED APPLICATION

This patent application claims priority to U.S. Provisional Patent Application No. 62/981,529 entitled "SCRAMBLING SEQUENCES AND SIGNALING INDICATIONS THEREOF" filed on Feb. 25, 2020, which is assigned to the assignee hereof. The disclosures of all prior applications are considered part of and are incorporated by reference in this patent application in their respective entireties.

TECHNICAL FIELD

This disclosure relates generally to wireless communication, and more specifically, to sounding techniques for radio frequency (RF) sensing in wireless communication systems.

DESCRIPTION OF THE RELATED TECHNOLOGY

Wireless communication devices communicate by transmitting and receiving electromagnetic signals in the radio frequency (RF) spectrum. The operating environment of the wireless communication devices affects the propagation of the electromagnetic signals. For example, electromagnetic signals transmitted by a transmitting device may reflect off objects and surfaces in the environment before reaching a receiving device located a distance away. Accordingly, the amplitudes or phases of the electromagnetic signals received by the receiving device may depend, at least in part, on the characteristics of the environment.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by a transmitting device, and may include determining a set of scrambling initialization bits, and generating a scrambling sequence based on the set of scrambling initialization bits and an $11^{th}$-order polynomial. The method may include providing an indication of the set of scrambling initialization bits in a physical layer convergence protocol (PLCP) protocol data unit (PPDU). The method may include scrambling one or more portions of the PPDU based on the scrambling sequence. The method may include transmitting the PPDU over a wireless medium. In some instances, the indication may be included in a Service field of the PPDU. In some other instances, the set of scrambling initialization bits may be included in the Service field of the PPDU.

In some implementations, the set of scrambling initialization bits consists of 11 bits. In some instances, the 11 scrambling initialization bits are carried in the 11 Least Significant Bits (LSBs) of the Service field of the PPDU. In some other implementations, at least a portion of the set of scrambling initialization bits may be derived from a bit sequence included in one of a basic service set (BSS) color field of the PPDU, a signaling field of the PPDU, a version-independent field of the PPDU, a version-dependent field of the PPDU, or a user field of the PPDU. In some instances, the version-independent field includes a Universal signaling field (U-SIG). In other instances, the version-dependent field includes one of an extremely high-throughput (EHT) signaling field (EHT-SIG) or a Universal signaling field (U-SIG) of the PPDU. In some other instances, the user field includes one or more user-specific fields of the EHT-SIG.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor. The at least one memory may store processor-readable code that, when executed by the at least one processor in conjunction with the at least one modem, is configured to determine a set of scrambling initialization bits, and to generate a scrambling sequence based on the set of scrambling initialization bits and an $11^{th}$-order polynomial. Execution of the processor-readable code may be further configured to provide an indication of the set of scrambling initialization bits in a PPDU. Execution of the processor-readable code may be further configured to scramble one or more portions of the PPDU based on the scrambling sequence. Execution of the processor-readable code may be further configured to transmit the PPDU over a wireless medium. In some instances, the indication may be included in a Service field of the PPDU. In some other instances, the set of scrambling initialization bits may be included in the Service field of the PPDU.

In some implementations, the set of scrambling initialization bits consists of 11 bits. In some instances, the 11 scrambling initialization bits are carried in the 11 LSBs of the Service field of the PPDU. In some other implementations, at least a portion of the set of scrambling initialization bits may be derived from a bit sequence included in one of a BSS color field of the PPDU, a signaling field of the PPDU, a version-independent field of the PPDU, a version-dependent field of the PPDU, or a user field of the PPDU. In some instances, the version-independent field includes a U-SIG. In other instances, the version-dependent field includes one of an EHT-SIG or a U-SIG of the PPDU. In some other instances, the user field includes one or more user-specific fields of the EHT-SIG.

Another innovative aspect of the subject matter described in this disclosure can be implemented in a method for wireless communication. The method may be performed by a transmitting device, and may include selecting one set of a plurality of sets of scrambling initialization bits, and generating a scrambling sequence based on the selected set of scrambling initialization bits and a polynomial. The method may include providing an indication of the selected set of scrambling initialization bits in a PPDU. The method may include scrambling one or more portions of the PPDU based on the scrambling sequence. The method may include transmitting the PPDU over a wireless medium. In some implementations, the polynomial is an $11^{th}$-order polynomial. In some instances, the indication may be an index identifying the selected set of scrambling initialization bits.

In some implementations, each set of scrambling initialization bits consists of 11 bits. In some instances, the 11 scrambling initialization bits are carried in the 11 LSBs of the Service field of the PPDU. In some other implementations, at least a portion of the set of scrambling initialization bits may be derived from a bit sequence included in one of a BSS color field of the PPDU, a signaling field of the PPDU, a version-independent field of the PPDU, a version-dependent field of the PPDU, or a user field of the PPDU. In some instances, the version-independent field includes a U-SIG. In other instances, the version-dependent field includes one of an EHT-SIG or a U-SIG of the PPDU. In some other instances, the user field includes one or more user-specific fields of the EHT-SIG.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor. The at least one memory may store processor-readable code that, when executed by the at least one processor in conjunction with the at least one modem, is configured to select one set of a plurality of sets of scrambling initialization bits, and to generate a scrambling sequence based on the selected set of scrambling initialization bits and a polynomial. Execution of the processor-readable code may be further configured to provide an indication of the selected set of scrambling initialization bits in a PPDU. Execution of the processor-readable code may be further configured to scramble one or more portions of the PPDU based on the scrambling sequence. Execution of the processor-readable code may be further configured to transmit the PPDU over a wireless medium. In some implementations, the polynomial is an $11^{th}$-order polynomial. In some instances, the indication may be an index identifying the selected set of scrambling initialization bits.

In some implementations, each set of scrambling initialization bits consists of 11 bits. In some instances, the 11 scrambling initialization bits are carried in the 11 LSBs of the Service field of the PPDU. In some other implementations, at least a portion of the set of scrambling initialization bits may be derived from a bit sequence included in one of a BSS color field of the PPDU, a signaling field of the PPDU, a version-independent field of the PPDU, a version-dependent field of the PPDU, or a user field of the PPDU. In some instances, the version-independent field includes a U-SIG. In other instances, the version-dependent field includes one of an EHT-SIG or a U-SIG of the PPDU. In some other instances, the user field includes one or more user-specific fields of the EHT-SIG.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
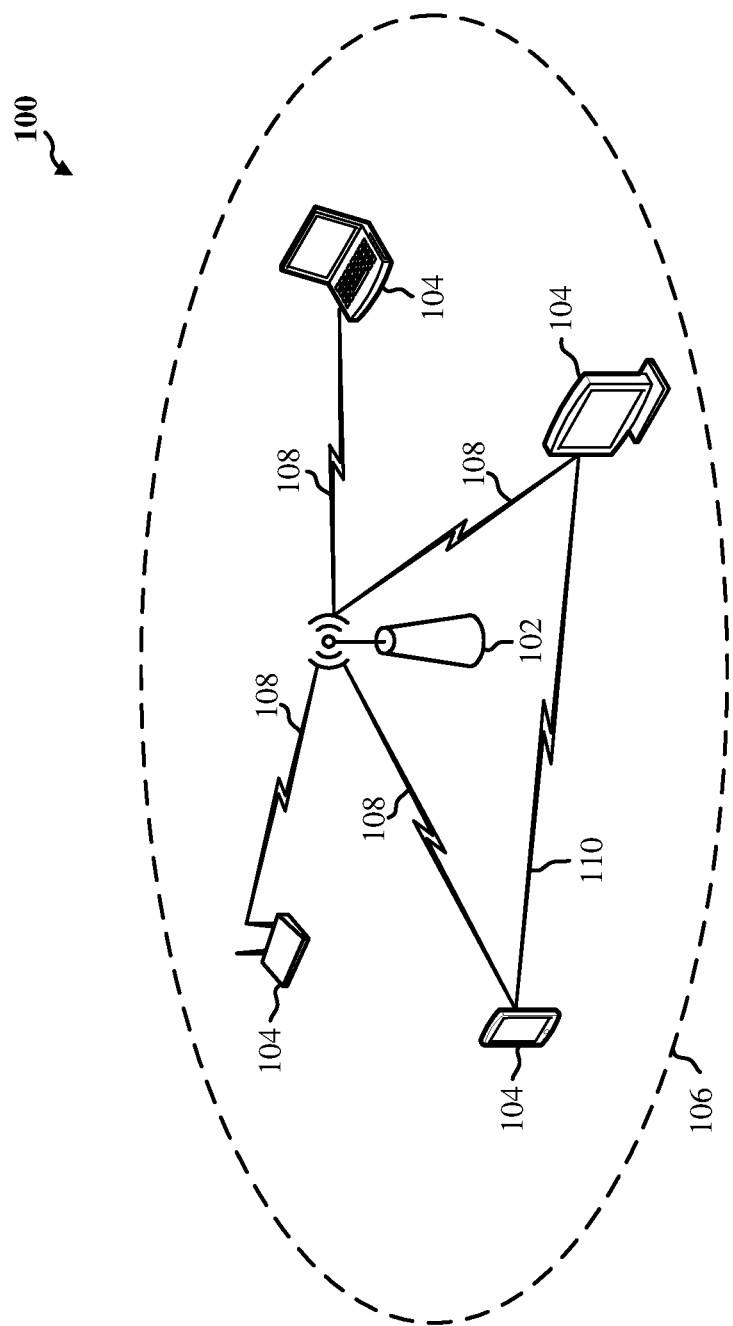
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to scrambling data for transmission on a wireless medium. Some implementations more specifically relate to scrambling communications between wireless communication devices that may operate according to one or more next versions of the Institute of Electrical and Electronics Engineers (IEEE) 802.11 family of standards. In some implementations, a wireless communication device operating as a transmitting device may determine a set of scrambling initialization bits for seeding a scrambler, and the scrambler may generate a scrambling sequence based on the set of scrambling initialization bits and one or more polynomials. The scrambling sequence may be used to scramble one or more portions of data to be transmitted to a receiving device, for example, to randomize the data in a manner that reduces the peak-to-average power ratio (PAPR) of data transmissions on the wireless medium. The transmitting device may provide an indication of the set of scrambling initialization bits with the transmitted data so that one or more receiving devices can seed their respective descramblers with the same set of scrambling initialization bits.

The scrambling sequence may be based on the set of scrambling initialization bits and a $Q^{th}$-order polynomial, where Q is an integer greater than 7, such that the resulting scrambling sequence is longer than conventional scrambling sequences used by wireless communication devices operating according to previous IEEE 802.11 standards. In some implementations, the scrambling sequence may be based on a set of 11 scrambling initialization bits and an $11^{th}$-order polynomial. In some instances, the set of scrambling initialization bits is included in a Service field of a physical layer convergence protocol (PLCP) protocol data unit (PPDU). For example, the 11 scrambling initialization bits may be carried in the 11 Least Significant Bits (LSBs) of the Service field of the PPDU.

In other implementations, the transmitting device may generate the scrambling sequence based on the set of scrambling initialization bits and a combination of first and second binary sequences. In some instances, the first sequence may be based on the first set of scrambling initialization bits and a first polynomial, and the scrambling sequence may be generated by multiplying the first sequence with each bit of the second sequence. In some aspects, the second sequence may be identical to the first sequence, and in other aspects, the second sequence may be based on or derived from the first sequence. In other instances, the second sequence may be based on the first polynomial and a second set of scrambling initialization bits different than the first set of scrambling initialization bits, and an indication of the second set of scrambling initialization bits may be provided to a receiving device. In some other implementations, the second sequence may be based on a second set of scrambling initialization bits different than the first set of scrambling initialization bits and a second polynomial different than the first polynomial. In some other implementations, the transmitting device may select one set of a plurality of sets of scrambling initialization bits, may generate a scrambling sequence based on the selected set of scrambling initialization bits and a polynomial, and may provide an indication of the selected set of scrambling initialization bits in the PPDU.

Particular implementations of the subject matter described in this disclosure can be implemented to realize one or more of the following potential advantages. In some implementations, a transmitting device may use a longer scrambling sequence generated by a higher-order polynomial to scramble data for transmission to a receiving device. That is, while wireless communication devices typically use a 127-bit scrambling sequence based on a $7^{th}$ order polynomial $S(x)=x^7+x^4+1$ and a 7-bit scrambling initialization code, wireless communication devices practicing aspects of the subject matter disclosed herein may use a 2047-bit scrambling sequence based on an $11^{th}$ order polynomial $S(x)=x^{11}+x^9+1$ and an 11-bit scrambling initialization code to scramble data for transmission to one or more receiving devices. In this way, the described techniques can be used to reduce the PAPR of data transmissions by increasing the degree of randomness with which the data bits or symbols are transmitted.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
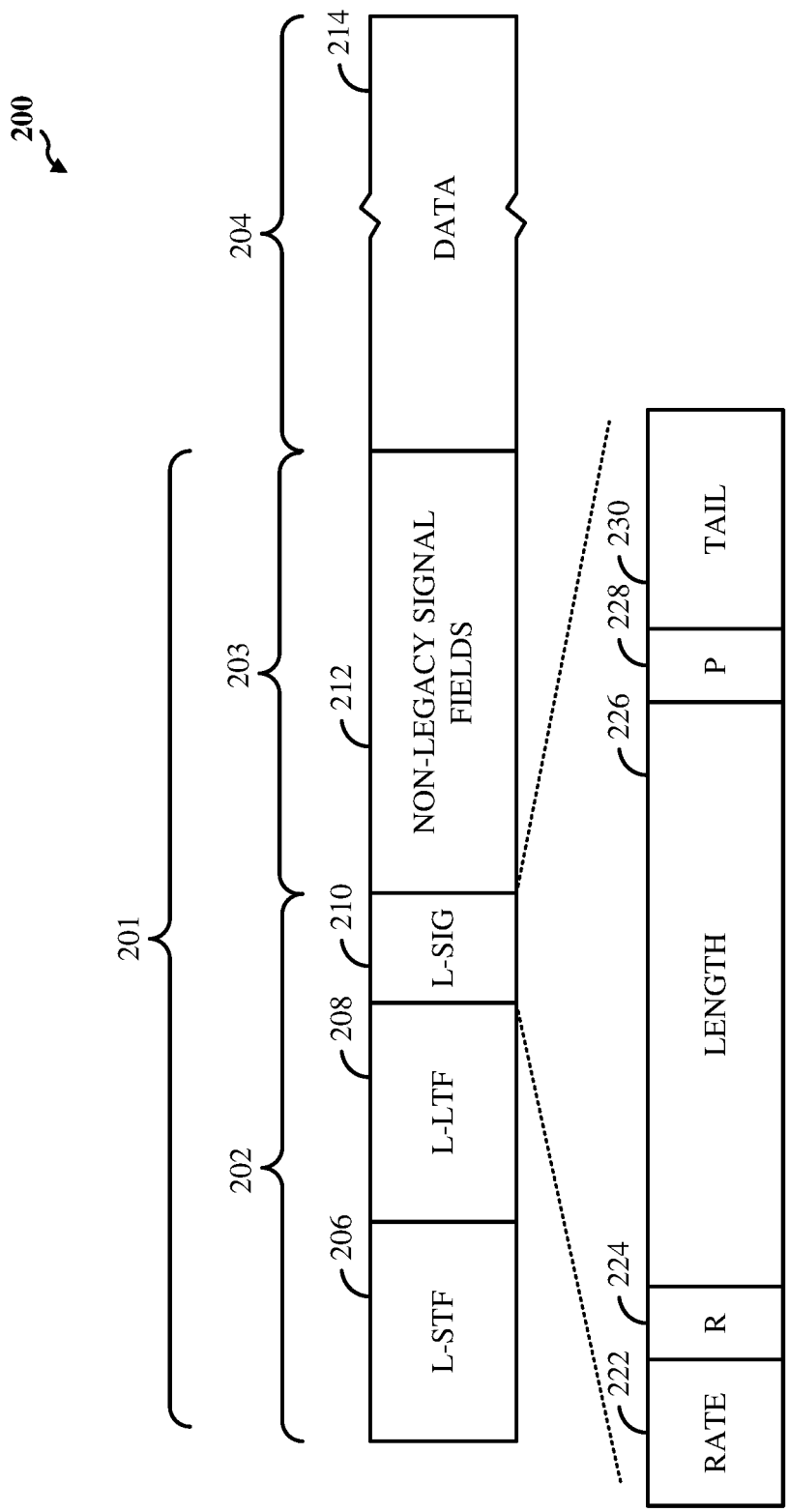
FIG. 2 shows an example protocol data unit (PDU) usable for communications between an access point (AP) and each of a number of stations (STAs).

FIG. 2 shows an example protocol data unit (PDU) 200 usable for wireless communication between an AP and a number of STAs. For example, the PDU 200 can be configured as a PPDU. As shown, the PDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard. The preamble 201 may also include a second portion 203 including one or more non-legacy signal fields 212, for example, conforming to an IEEE wireless communication protocol such as the IEEE 802.11ac, 802.11ax, 802.11be or later wireless communication protocol standards.

L-STF 206 generally enables a receiving device to perform automatic gain control (AGC) and coarse timing and frequency estimation. L-LTF 208 generally enables a receiving device to perform fine timing and frequency estimation and also to perform an initial estimate of the wireless channel. L-SIG 210 generally enables a receiving device to determine a duration of the PDU and to use the determined duration to avoid transmitting on top of the PDU. For example, L-STF 206, L-LTF 208 and L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2 also shows an example L-SIG 210 in the PDU 200. L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
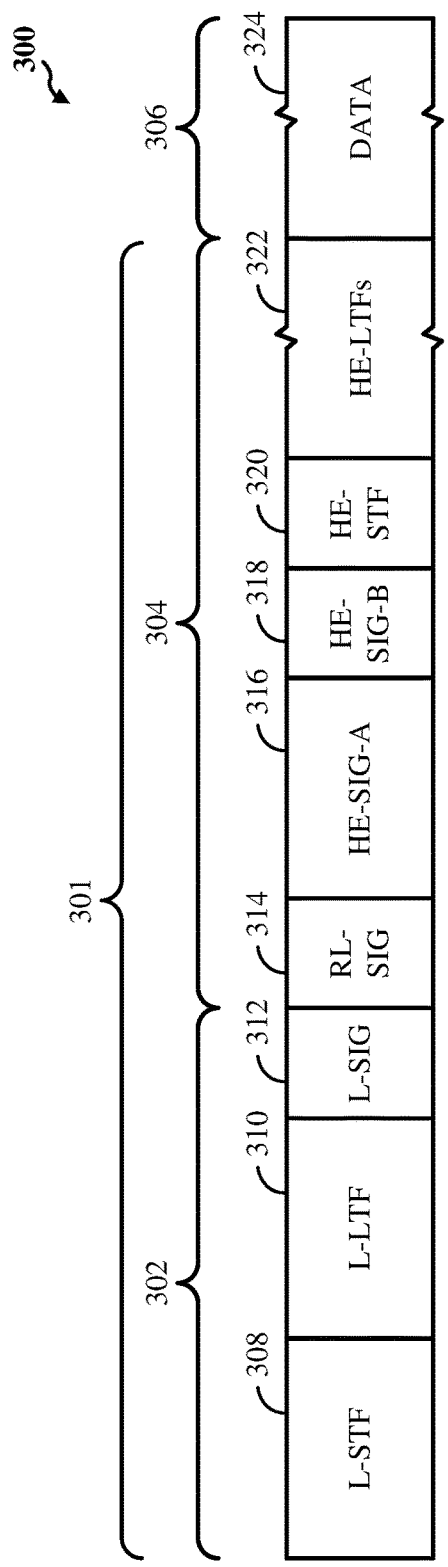
FIG. 3A shows an example PDU usable for communications between an AP and each of a number of STAs.

FIG. 3A shows an example PDU 300 usable for wireless communication between an AP and a number of STAs. The PDU 300 may be used for MU-OFDMA or MU-MIMO transmissions. The PDU 300 includes a PHY preamble 301 including a first portion 302 and a second portion 304. The PDU 300 may further include a PHY payload 306 after the preamble, for example, in the form of a PSDU including a DATA field 324. The DATA field 324 may include a number of DATA fields (or symbols). The first portion 302 of the preamble includes a legacy short training field (STF) (L-STF) 308, a legacy long training field (LTF) (L-LTF) 310, and a legacy signaling field (L-SIG) 312. The HE-STF 320, HE-LTFs 322, and the DATA field 324 may be formatted as a High Efficiency (HE) WLAN preamble and frame, respectively, in accordance with the IEEE 802.11ax amendment to the IEEE 802.11 wireless communication protocol standard. The second portion 304 includes a repeated legacy signal field (RL-SIG) 314, a first HE signal field (HE-SIG-A) 316, a second HE signal field (HE-SIG-B) 318 encoded separately from HE-SIG-A 316, an HE short training field (HE-STF) 320, and a number of HE long training fields (or symbols) (HE-LTFs) 322. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, HE-SIG-B 318 may be unique to each 20 MHz channel and may target specific STAs 104. In some implementations, the PDU 300 may not include HE-SIG-B 318, as indicated by the dashed lines. For example, if the PDU 300 is an HE MU PPDU, the PDU 300 may include HE-SIG-B 318, and if the PDU 300 is not an HE MU PPDU, the PDU 300 may not include HE-SIG-B 318.

The PDU 300 includes a number of pre-HE modulated fields (or symbols) 330, such as L-STF 308, L-LTF 310, L-SIG 312, RL-SIG 314, HE-SIG-A 316, and HE-SIG-B 318. The PDU 300 also includes a number of HE modulated fields (or symbols) 340, such as HE-STF 320, HE-LTFs 322, and DATA field 324. In some implementations, phase rotations may be defined for (and applied to) each of L-STF 308, L-LTF 310, L-SIG 312, RL-SIG 314, HE-SIG-A 316, and HE-SIG-B 318 of the preamble of the PDU 300, for example, because they are each a pre-HE modulated field. In some aspects, the same phase rotation may be applied to each of L-STF 308, L-LTF 310, L-SIG 312, RL-SIG 314, HE-SIG-A 316, and HE-SIG-B 318.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. HE-SIG-A 316 may be decoded by each HE-compatible STA 104 served by the AP 102. HE-SIG-A 316 includes information usable by each identified STA 104 to decode an associated HE-SIG-B 318. For example, HE-SIG-A 316 may indicate the frame format, including locations and lengths of HE-SIG-Bs 318, available channel bandwidths, modulation and coding schemes (MCSs), among other possibilities. HE-SIG-A 316 also may include HE WLAN signaling information usable by STAs 104 other than the number of identified STAs 104.

HE-SIG-B 318 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 318 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 324.

Figure 3B:
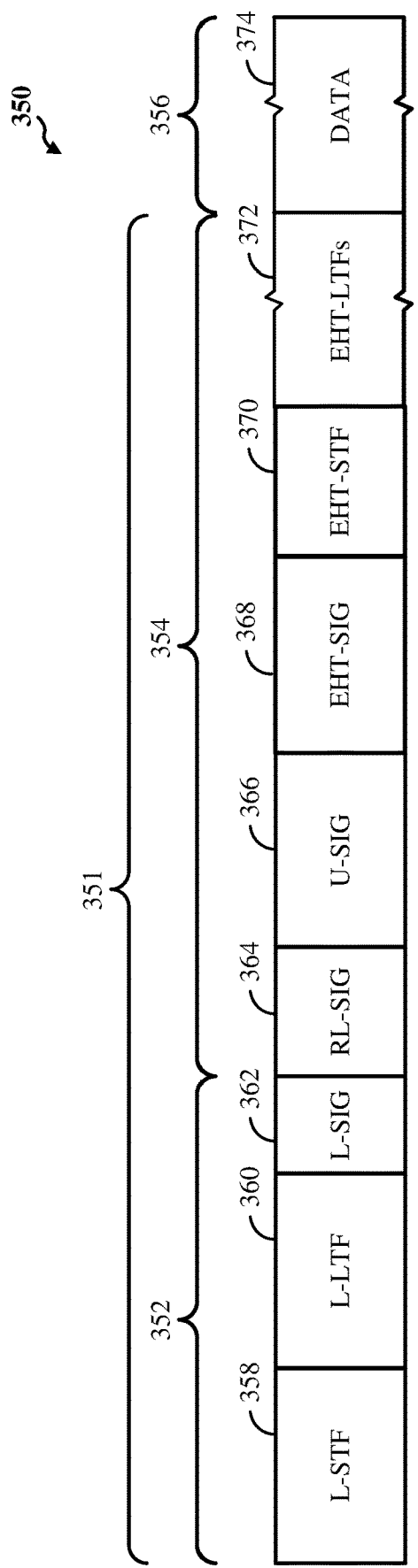
FIG. 3B shows another example PDU usable for communications between an AP and each of a number of STAs.

FIG. 3B shows an example PPDU 350 usable for wireless communication between an AP and a number of STAs according to some implementations. The PPDU 350 may be used for SU, MU-OFDMA, or MU-MIMO transmissions. The PPDU 350 includes a PHY preamble including a first portion 352 and a second portion 354. The PPDU 350 may further include a PHY payload 356 after the preamble, for example, in the form of a PSDU including a DATA field 376. The first portion 352 of the preamble includes a legacy short training field (STF) (L-STF) 358, a legacy long training field (LTF) (L-LTF) 360, and a legacy signaling field (L-SIG) 362. The EHT-STF 372, the EHT-LTFs 374, and the DATA field 376 may be formatted as an Extreme High Throughput (EHT) WLAN preamble and frame, respectively, in accordance with the IEEE 802.11be amendment to the IEEE 802.11 wireless communication protocol standard, or may be formatted as a preamble and frame, respectively, conforming to any later (post-EHT) version of a new wireless communication protocol conforming to a future IEEE 802.11 wireless communication protocol standard or other wireless communication standard.

The second portion 354 of the preamble includes a repeated legacy signal field (RL-SIG) 364 and multiple wireless communication protocol version-dependent signal fields after RL-SIG 364. For example, the second portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. In some implementations, the PPDU 350 may not include EHT-SIG 368, as indicated by the dashed lines. For example, if the PPDU 350 is of a first PPDU type, the PPDU 350 may include EHT-SIG 368, and if the PPDU 350 is of a second PPDU type, the PPDU 350 may not include EHT-SIG 368. The second portion 354 further includes an additional short training field 372 (referred to herein as "EHT-STF 372," although it may be structured as, and carry version-dependent information for, other wireless communication protocol versions beyond EHT) and a number of additional long training fields 374 (referred to herein as "EHT-LTFs 374," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

As described above, by applying specific phase rotations to particular tones, such as for pre-EHT modulated fields (or symbols), a transmitting device may reduce the peak-to-average power ratio (PAPR) of time domain signals to be transmitted on a wireless medium. The PPDU 350 includes a number of pre-EHT modulated fields (or symbols) 370, such as L-STF 358, L-LTF 360, L-SIG 362, RL-SIG 364, U-SIG 366, and EHT-SIG 368. The PPDU 350 also includes a number of EHT-modulated fields (or symbols) 380, such as EHT-STF 372, EHT-LTFs 374, and DATA field 376. Thus, in some implementations, phase rotations may be defined for (and applied to) each of L-STF 358, L-LTF 360, L-SIG 362, RL-SIG 364, U-SIG 366, and EHT-SIG 368 of the PPDU 350, for example, because they are each a pre-EHT modulated field.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources. EHT-SIG 368 may be decoded by each compatible STA 104 served by the AP 102. EHT-SIG 368 may generally be used by a receiving device to interpret bits in one or more other fields, such as DATA field 376. For example, EHT-SIG 368 may indicate the resource allocation of DATA fields included in DATA field 376 in the various component channels, available channel bandwidths, and modulation and coding schemes (MCSs), among other possibilities. EHT-SIG 368 may further include a cyclic redundancy check (CRC) (for example, four bits) and a tail (for example, 6 bits) that may be used for binary convolutional code (BCC). In some implementations, EHT-SIG 368 may include a number of code blocks that each include a CRC and a tail. In some aspects, each of the number of code blocks may be encoded separately.

EHT-SIG 368 may carry STA-specific scheduling information such as, for example, per-user MCS values and per-user RU allocation information. EHT-SIG 368 may generally be used by a receiving device to interpret bits in the DATA field 376. In the context of DL MU-OFDMA, such information enables the respective STAs 104 to identify and decode corresponding RUs in the associated DATA field 376. Each EHT-SIG 368 may include a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include, for example, two user fields that contain information for two respective STAs to decode their respective RU payloads.

U-SIG 366, and RL-SIG 364 if present, may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard or other standard. For example, U-SIG 366 may be used by a receiving device to interpret bits in one or more of EHT-SIG 368 or the DATA field 376. In some implementations, U-SIG 366 may include a reserved bit that indicates whether the PPDU 350 is, for example, compliant with EHT or a later version of the IEEE 802.11 family of wireless communication protocol standards or other standards. In some implementations, U-SIG 366 includes a version field that includes at least one bit indicating the particular wireless communication protocol version to which the PPDU 350 conforms.

In the IEEE 802.11be amendment to the IEEE 802.11 family of standards (or in future amendments), new fields may be used to carry signaling information. For example, the new fields and signaling information may be included in U-SIG 366. Additionally, new fields and signaling information may be included in EHT-SIG 368. If additional training signals are sent on other tones prior to U-SIG (such as additional training signals in L-SIG and RL-SIG in 11ax), then each symbol in U-SIG may carry more usable data for feature signaling rather than training signals. In some implementations, U-SIG 366 includes two symbols, which may be jointly encoded together in a single block, and which may each carry twenty-six usable data (or "information") bits. For example, the bits in U-SIG 366 may include signaling regarding types or formats of additional signal fields (such as the EHT-SIG 368) that follows the U-SIG 366. EHT-SIG 368 may have a clear symbol boundary. In some implementations, a fixed MCS may be used for EHT-SIG 368. In some implementations, the MCS and DCM for EHT-SIG 368 may be indicated in U-SIG 366.

Figure 4A:
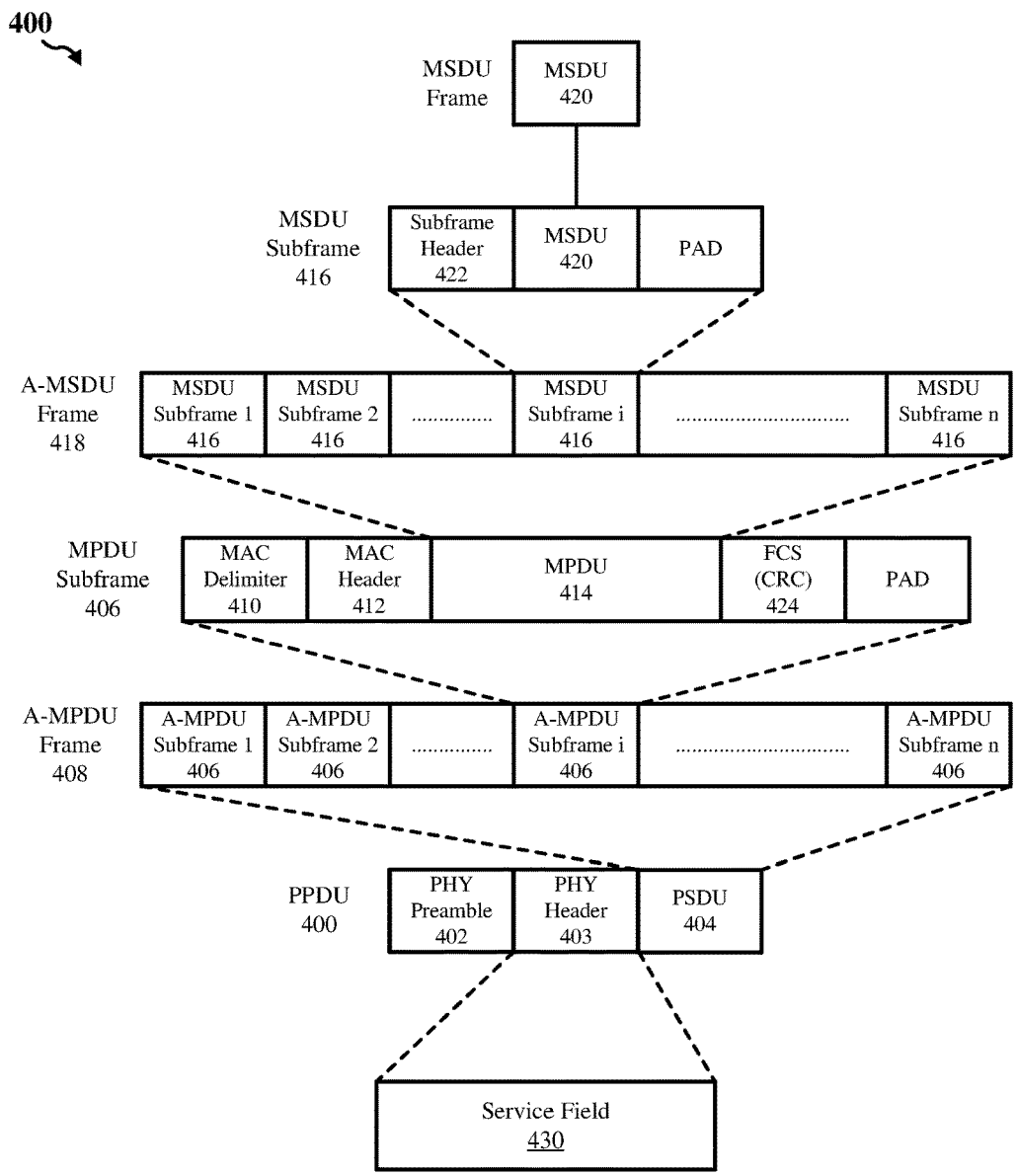
FIG. 4A shows an example physical layer convergence protocol (PLCP) protocol data unit (PPDU) usable for communications between an AP and each of a number of STAs.

FIG. 4A shows an example PPDU 400 usable for communications between an AP 102 and a number of STAs 104. As described above, each PPDU 400 includes a PHY preamble 402, a PHY header 403, and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which includes the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 may also include a frame check sequence (FCS) field 424 for error detection. For example, the FCS field 416 may include a cyclic redundancy check (CRC).

The PHY header 403 includes a service field 430, among other fields not shown for simplicity. The service field 430 may store a set of scrambling initialization bits that can be used to seed a scrambler of a wireless communication device (not shown for simplicity). In some implementations, the service field 430 may include 16 bits denoted as bits 0-15, where the first 7 bits (bits 0-6) may be used to store the set of scrambling initialization bits, and the remaining 9 bits (bits 7-15) may be reserved. In some instances, bits 0-6 of the service field 430, which are transmitted first, are set to 0 s and are used to synchronize the descrambler in the receiver.

Figure 4B:
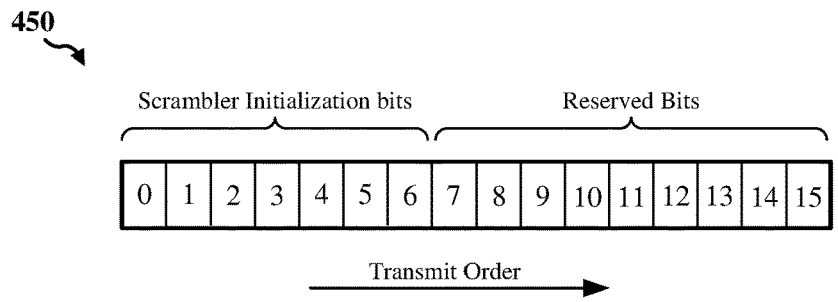
FIG. 4B shows an illustration depicting an example service field of a physical-layer (PHY) header.

FIG. 4B shows an illustration 450 depicting bits of an example service field of a PHY header. As discussed, the first 7 bits (bits 0-6) may store scrambling initialization bits, and the remaining 9 bits (bits 7-15) may be reserved. As shown in FIG. 4B, the 16 bits of the service field are sequentially transmitted in order, with the first bit (bit 0) transmitted first and the last bit (bit 15) transmitted last.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas. APs and STAs that include multiple antennas may also support space—time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams (described below). The $N_{SS}$ spatial streams may be mapped to a number $N_{STS}$ of space-time streams, which are then mapped to $N_{Tx}$ transmit chains.

APs and STAs that include multiple antennas may also support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are then separately encoded and transmitted in parallel via the multiple $N_{Tx}$ transmit antennas. If the transmitting device includes $N_{Tx}$ transmit antennas and the receiving device includes $N_{Rx}$ receive antennas, the maximum number $N_{SS}$ of spatial streams that the transmitting device can simultaneously transmit to the receiving device is limited by the lesser of $N_{Tx}$ and $N_{Rx}$. In some implementations, the AP 102 and STAs 104 may be able to implement both transmit diversity as well as spatial multiplexing. For example, in instances in which the number $N_{SS}$ of spatial streams is less than the number $N_{Tx}$ of transmit antennas, the spatial streams may be multiplied by a spatial expansion matrix to achieve transmit diversity.

APs and STAs that include multiple antennas may also support beamforming. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). To perform beamforming, a transmitting device, referred to as the beamformer, transmits a signal from each of multiple antennas. The beamformer configures the amplitudes and phase shifts between the signals transmitted from the different antennas such that the signals add constructively along particular directions towards the intended receiver, which is referred to as a beamformee. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. The beamformee may then perform measurements for each of the $N_{Tx} \times N_{Rx}$ sub-channels corresponding to all of the transmit antenna and receive antenna pairs based on the sounding signal. The beamformee generates a feedback matrix based on the channel measurements and, typically, compresses the feedback matrix before transmitting the feedback to the beamformer. The beamformer may then generate a precoding (or "steering") matrix for the beamformee based on the feedback and use the steering matrix to precode the data streams to configure the amplitudes and phase shifts for subsequent transmissions to the beamformee.

Figure 5:
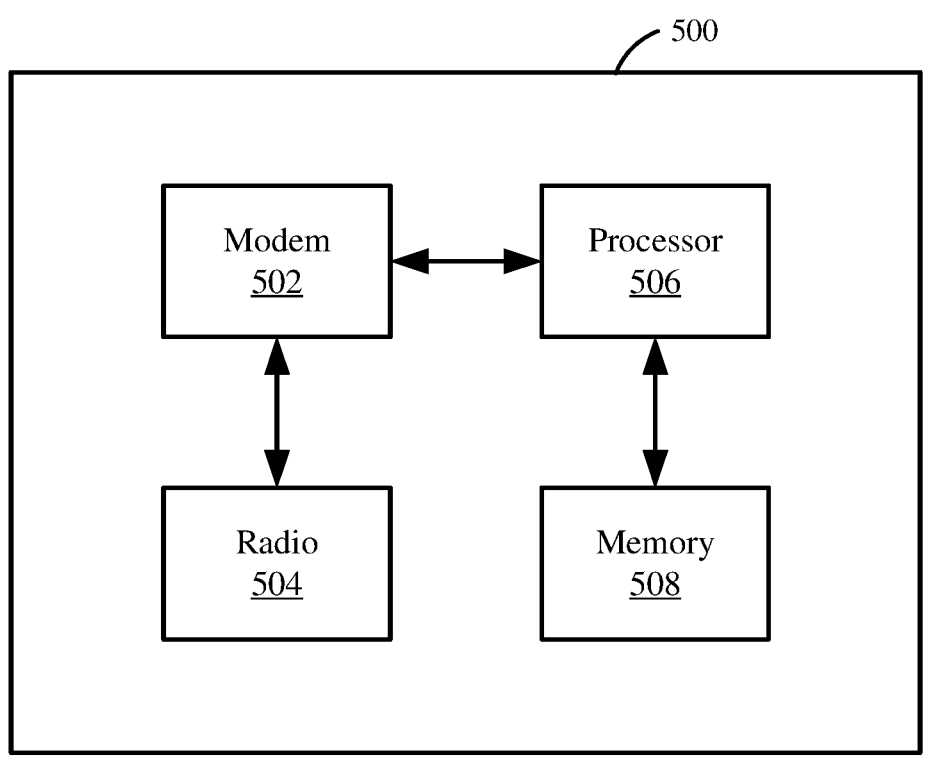
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506") and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
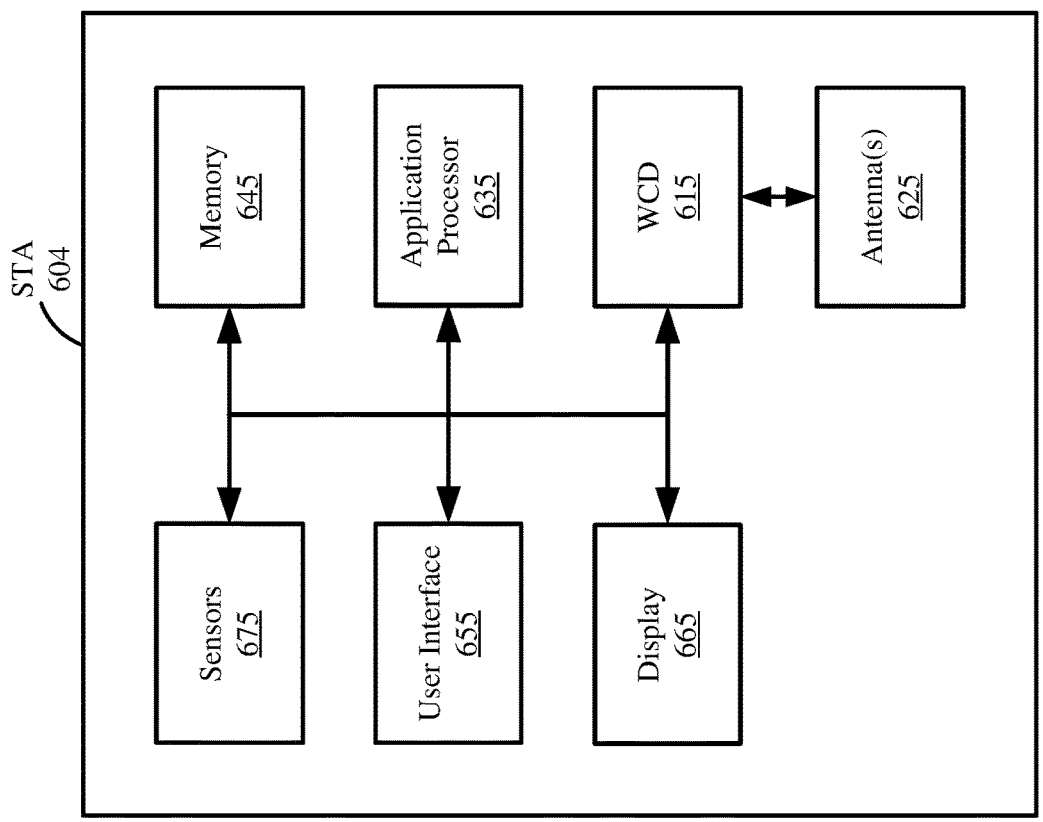
FIG. 6B shows a block diagram of an example STA.
Figure 6A:
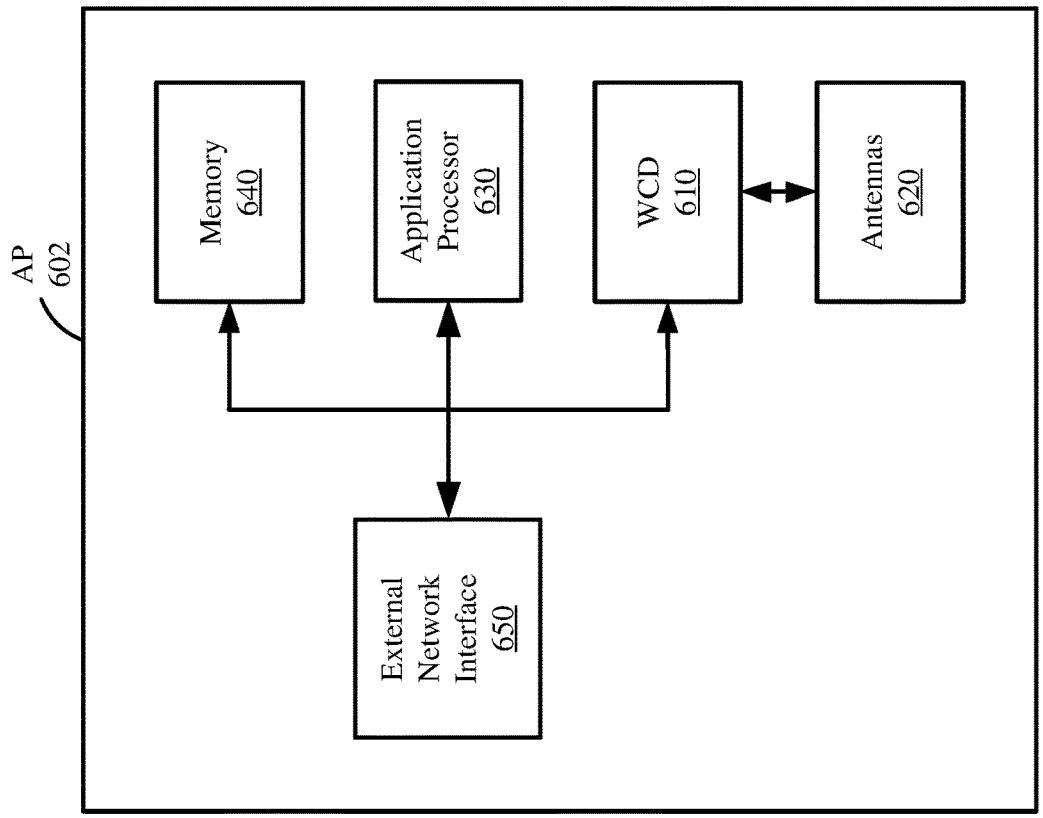
FIG. 6A shows a block diagram of an example AP.

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

Figure 7:
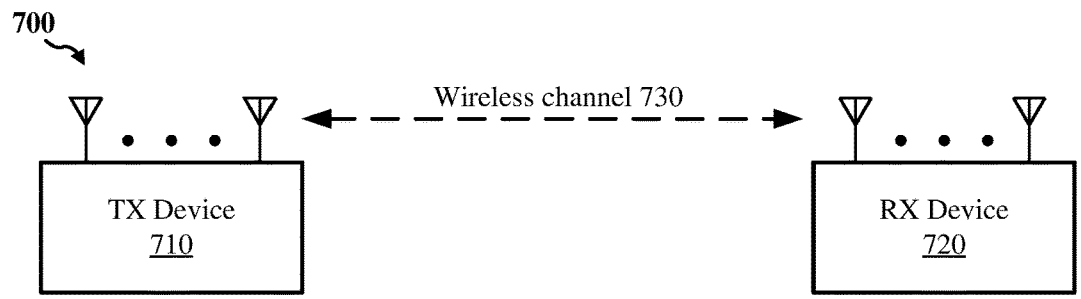
FIG. 7 shows an example communication between wireless communication devices according to some implementations.

FIG. 7 shows an example communication 700 between wireless communication devices according to some implementations. The communication 700 is between a transmitting (TX) device 710 and a receiving (RX) device 720. In some implementations, the transmitting device 710 may be an AP such as the AP 102 of FIG. 1 or the AP 602 of FIG. 6A. In some other implementations, the transmitting device 710 may be a STA such as the STA 104 of FIG. 1 or the STA 604 of FIG. 6B. Similarly, in some implementations, the receiving device 720 may be an AP such as the AP 102 of FIG. 1 or the AP 602 of FIG. 6A, while in some other implementations, the receiving device 720 may be a STA such as the STA 104 of FIG. 1 or the STA 604 of FIG. 6B. As shown, the transmitting device 710 may be configured to transmit scrambled communications over a wireless channel 730 to the receiving device 720, and the receiving device 720 may be configured to receive and descramble the scrambled communications.

Figure 8A:
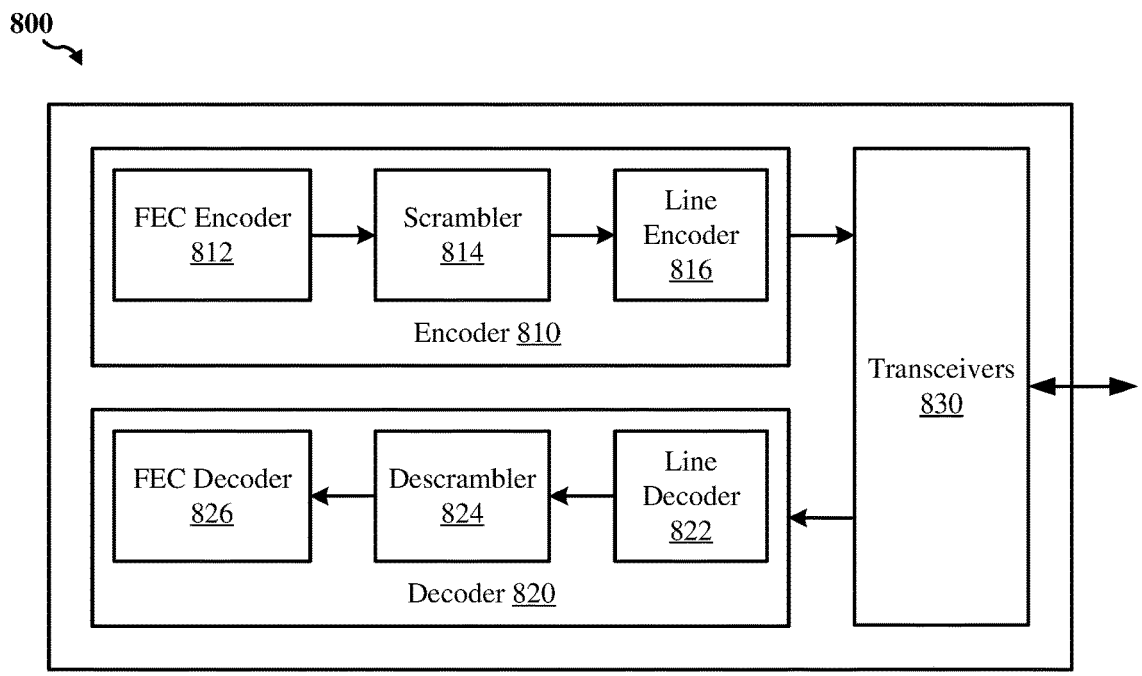
FIG. 8A shows a block diagram of an example wireless communication device according to some implementations.

FIG. 8A shows a block diagram of an example wireless communication device 800 according to some implementations. In some implementations, the wireless communication device 800 may be an AP such as the AP 102 of FIG. 1 or the AP 602 of FIG. 6A. In some other implementations, the wireless communication device 800 may be a STA such as the STA 104 of FIG. 1 or the STA 604 of FIG. 6B.

The wireless communication device 800 includes an encoder 810, a decoder 820, and a transceiver 830. The transceiver 830, which coupled between the encoder 810 and the decoder 820, may be used to transmit communications to one or more other devices on a wireless medium (not shown for simplicity), and may be used to receive communications from one or more other devices on the wireless medium. When operating as a transmitting device (such as the transmitting device 710 of FIG. 7), the transceiver 830 outputs line-coded data symbols from the encoder 810 onto the wireless medium. When operating as a receiving device (such as the receiving device 720 of FIG. 7), the transceiver 830 receives line-coded data symbols from the wireless medium and forwards the received symbols to the decoder 820.

The encoder 810 encodes information bits for transmission over the wireless medium. As shown, the encoder 810 includes a forward error correction (FEC) encoder 812, a scrambler 814, and a line encoder 816. The FEC encoder 812 provides error checking and correcting capability by introducing redundancy into the bit stream. The redundant bits may provide additional information as to what the original information bits should be, and may allow a receiver to correct any errors in the received bit stream without requesting re-transmission of the entire bit stream. In some instances, the FEC encoder 812 may implement a Reed-Solomon encoding scheme. The scrambler 814 may be used to randomize information bits to reduce the frequency of long runs of ones or zeroes without introducing additional bits into the bit stream. The line encoder 816 converts the scrambled bitstream to a sequence of symbols suitable for transmission over the wireless medium. In some implementations, the line encoder 816 may implement a line coding scheme that reduces error propagation.

The decoder 820 decodes received data symbols by reversing the operations of the encoder 810. As shown, the decoder 820 includes a line decoder 822, a descrambler 824, and a FEC decoder 826. The line decoder 822 may de-map the received data symbols into a bitstream based on the line coding scheme/mapping implemented by the line encoder 816. The descrambler 824 rearranges or descrambles the bits in the bitstream based on the randomization scheme implemented by the scrambler 814. The FEC decoder 826 checks the bit stream for errors and, after correcting any errors that may have been detected, recovers the original set of information bits.

Figure 8B:
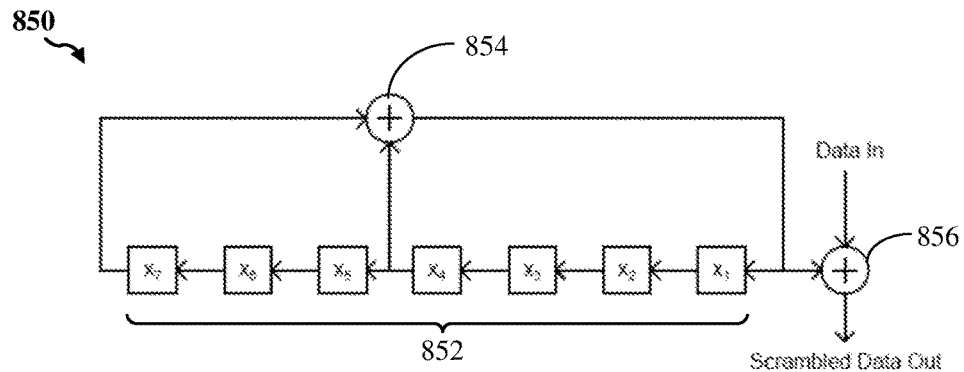
FIG. 8B shows a block diagram of an example scrambler useable for scrambling communications between wireless communication devices according to some implementations.

FIG. 8B shows a block diagram of an example scrambler 850 useable for scrambling communications between wireless communication devices according to some implementations. In some implementations, the scrambler 850 may be one example of the scrambler 814 of FIG. 8A. As shown, the scrambler 850 includes register set 852, a first summing node 854, and a second summing node 856. The scrambler 850 may be configured to scramble the contents of the data field, the PHY preamble, and the PHY header of an MPDU prior to encapsulating the MPDU into a PPDU. The contents of the data field, the PHY preamble, and the PHY header of the MPDU may be serialized and mixed with a scrambling sequence to randomize the data, for example, to reduce the PAPR of PPDU transmissions. Typically, a 7-bit pseudo-random non-zero sequence is provided as a set of scrambling initialization bits and used to seed the scrambler 850 to an initial state. Once seeded, the scrambler 850 may generate a 127-bit scrambling sequence that is used to scramble the PHY preamble, the PHY header, and the data contained in the MPDU. In some implementations, the 127-bit scrambling sequence may be generated based on the expression $S(x)=x^7+x^4+1$, which is a $7^{th}$ order polynomial, and the 7-bit scrambling initialization code may be transmitted to a receiving device in the service field of the PHY header. The receiving device uses the 7-bit scrambling initialization code provided in the service field of the PHY header to initialize its descrambler, for example, so that the descrambler in the receiving device is synchronized with the scrambler in the transmitting device.

As discussed, if any of the scrambling initialization bits are not correctly received by the receiving device, the receiving device may not be able to correctly seed its descrambler, which in turn may not generate the correct scrambling sequence—and therefore may not be able to correctly descramble the PPDU sent from the transmitting device. As such, there is a need to increase protection of the scrambling initialization bits when sent from a transmitting device to a receiving device.

In some implementations, a transmitting device may use a longer scrambling sequence generated by a higher-order polynomial to scramble data for transmission to a receiving device. In some instances, the scrambler 850 may use a $Q^{th}$-order polynomial such as $\Sigma_{i=0}^{Q} a_i x^i$ to generate the scrambling sequence, where Q>7 and the coefficients $a_i \in \{0, 1\}$. A scrambling sequence generated by the $Q^{th}$-order polynomial has a periodicity equal to the length of the basic scrambling sequence. A Q-bit initialization sequence is used for initialization of the scrambler. When Q<=16 such that the set of scrambling initialization bits is not greater than 16 bits, all of the scrambler initialization bits may be carried in the service field of the PPDU, for example, by inserting the first 7 scrambler initialization bits in the scrambling initialization portion of the service field and inserting the remaining scrambler initialization bits in the reserved bits of the service field.

When Q>16, the set of scrambling initialization bits may not fit within the service field. Or in the case when Q<=16, and only M bits in the service field are available to carry scrambler initialization bits and M<Q, the set of scrambling initialization bits may not fit within the M available bits in the service field. In some implementations, the Q scrambling initialization bits may consist of a number M of random or pseudo-random bits and a number Q−M of non-random bits, where M is an integer less than Q. The number M of random or pseudo-random bits may be provided in the Service field of the PPDU and transmitted to the receiving device, and the number Q−M of non-random bits may not be included in the PPDU. In some instances, the number Q−M of non-random bits may be defined in the Institute of Electrical and Electronics Engineers (IEEE) 802.11be amendment or later versions of the IEEE family of standards, and may be advertised to the receiving device. In some other instances, the number Q−M of non-random bits may be derived from a bit sequence provided in a signaling field of the PPDU.

For example, the bit sequence may be included in one of a basic service set (BSS) color field of the PPDU, a signaling field of the PPDU, a version-independent field of the PPDU, a version-dependent field of the PPDU, or a user field of the PPDU. The version-independent field may be a Universal signaling field (U-SIG), the version-dependent field may be one of an extremely high-throughput (EHT) signaling field (EHT-SIG) of the PPDU, and the user field may be one or more user-specific fields of an EHT-SIG.

In some other implementations, the transmitting device may determine a first set of scrambling initialization bits, may generate first and second binary sequences, which are both periodic sequences, and may generate the scrambling sequence based on a combination of the first and second binary sequences. In some instances, the first sequence may be based on the first set of scrambling initialization bits and a first polynomial, and the scrambling sequence may be generated by multiplying one period of the first sequence with each bit of one period of the second sequence. The first sequence may have a periodicity of 127 bits, the second sequence may have a periodicity of a number N bits, and the scrambling sequence has a periodicity of 127*N, where N is an integer greater than one. For example, the first sequence may be the 127-bit sequence defined in the IEEE 802 standards and expressed by the polynomial $s(x)=x^7+x^4+1$, and one period of the first sequence is denoted as [s[0] s[1] ... s[126]]. One period of the second sequence may be an N-bit binary sequence b[n], n=0, ..., N−1, and the scrambling sequence may be expressed as [b[0]s(x) b[1] s(x) ... b[N−1]s(x)]. In some examples, the first set of scrambling initialization bits may include 7 bits and may be carried within 7 non-reserved bit locations of a Service field of the PPDU.

In other examples, a first portion of the first set of scrambling initialization bits may be carried within a number of non-reserved bit locations of a Service field of the PPDU, and a second portion of the first set of scrambling initialization bits may be carried in one or more reserved service bits of the Service field. In some implementations, the first set of scrambling initialization bits and the first polynomial are defined by one or more legacy versions of the IEEE 802.11 family of standards. In some aspects, the second sequence is identical to the first sequence. In other aspects, the second sequence is based on or derived from the first sequence, for example, by shifting the first sequence by P bits (where P is an integer). For example, if the, e.g., [s[P] ... s[126] s[0] ... s[P−1]]. The value of P may be provided in the Service field of the PPDU. In some instances, the value of P is defined in the Institute of Electrical and Electronics Engineers (IEEE) 802.11be amendment or later versions of the IEEE family of standards, and may be advertised to the receiving device. In some other instances, the value of P may be derived from a bit sequence provided in a signaling field of the PPDU.

In other instances, the second sequence may be based on the first polynomial and a second set of scrambling initialization bits different than the first set of scrambling initialization bits, and an indication of the second set of scrambling initialization bits may be provided to a receiving device. In some aspects, the second set of scrambling initialization bits may be signaled in the service field of the PPDU. In some other aspects, the second set of scrambling initialization bits may be derived from one or more portions of a physical-layer (PHY) preamble of the PPDU. The one or more portions of the PHY preamble may include at least one of an extremely high throughput (EHT) signaling field (EHT-SIG) or a Universal signaling field (U-SIG) of the PPDU.

In some other instances, the second sequence may be based on a second set of scrambling initialization bits different than the first set of scrambling initialization bits and a second polynomial different than the first polynomial. An indication of the second set of scrambling initialization bits may be provided to a receiving device. In some aspects, the second set of scrambling initialization bits may be signaled in the service field of the PPDU. In some other aspects, the second set of scrambling initialization bits may be based on one or more portions of a physical-layer (PHY) preamble of the PPDU. The one or more portions of the PHY preamble includes at least one of an extremely high throughput (EHT) signaling field (EHT-SIG) or a Universal signaling field (U-SIG) of the PPDU.

In some of the techniques, e.g., HARQ, probability shaping, may need to derive the scrambling sequence after a segment of R bits on the fly. The receiver may store or generate one period of the first sequence (127 bits) and one period of the second sequence (N bits), instead of storing or generating the entire basic sequence of 127N bits. If the current bit in the scrambling sequence is b[i]s[j], 0≤i≤N−1, 0≤j≤126, after R bits, the scrambling bit should be b[k]s[l], 0≤k≤N−1, 0≤l≤126, where $$k = \mod\left(i + \text{floor}\left(\frac{(j+R)}{127}\right), N\right), l = \mod(j+R, 127).$$

The pilot polarity sequence could be generated by the data scrambler. In some instance, there is no change to pilot polarity sequence, i.e., using the old scrambler. In some other instances, the pilot polarity sequence could also be generated by the new data scrambler, with a fixed initial state, e.g., all 1's initial state.

In some other implementations, the transmitting device may select one set of a plurality of sets of scrambling initialization bits, may generate a scrambling sequence based on the selected set of scrambling initialization bits and a polynomial, and may provide an indication of the selected set of scrambling initialization bits in the PPDU. The indication may be an index identifying the selected set of scrambling initialization bits. In some instances, the indication may be repeated in the Service field of the PPDU. The sets of scrambling initialization bits may be defined in the IEEE 802.11be amendment or later versions of the IEEE family of standards. In some aspects, each set of the plurality of sets of scrambling initialization bits includes a number Q of bits, and each set of the plurality of sets of scrambling initialization bits may be derived from values (such as a bit sequence) included in one or more portions of a physical-layer (PHY) preamble of the PPDU. The one or more portions of the PHY preamble may include at least one of an extremely high throughput (EHT) signaling field (EHT-SIG) or a Universal signaling field (U-SIG) of the PPDU.

In some other implementations, the transmitting device may determine a set of scrambling initialization bits, may select one function of a plurality of different functions, and may generate a scrambling sequence based on the set of scrambling initialization bits and the selected function. The transmitting device may provide an indication of the selected set of scrambling initialization bits in the PPDU. In some instances, the indication may be an index identifying the selected function. In some aspects, the plurality of functions may include $2^m$ different functions, the indication may include m bits, and the indication may be provided within a Service field of the PPDU. The set of scrambling initialization bits may be defined by one or more legacy versions of the IEEE 802.11 family of standards.

Figure 9:
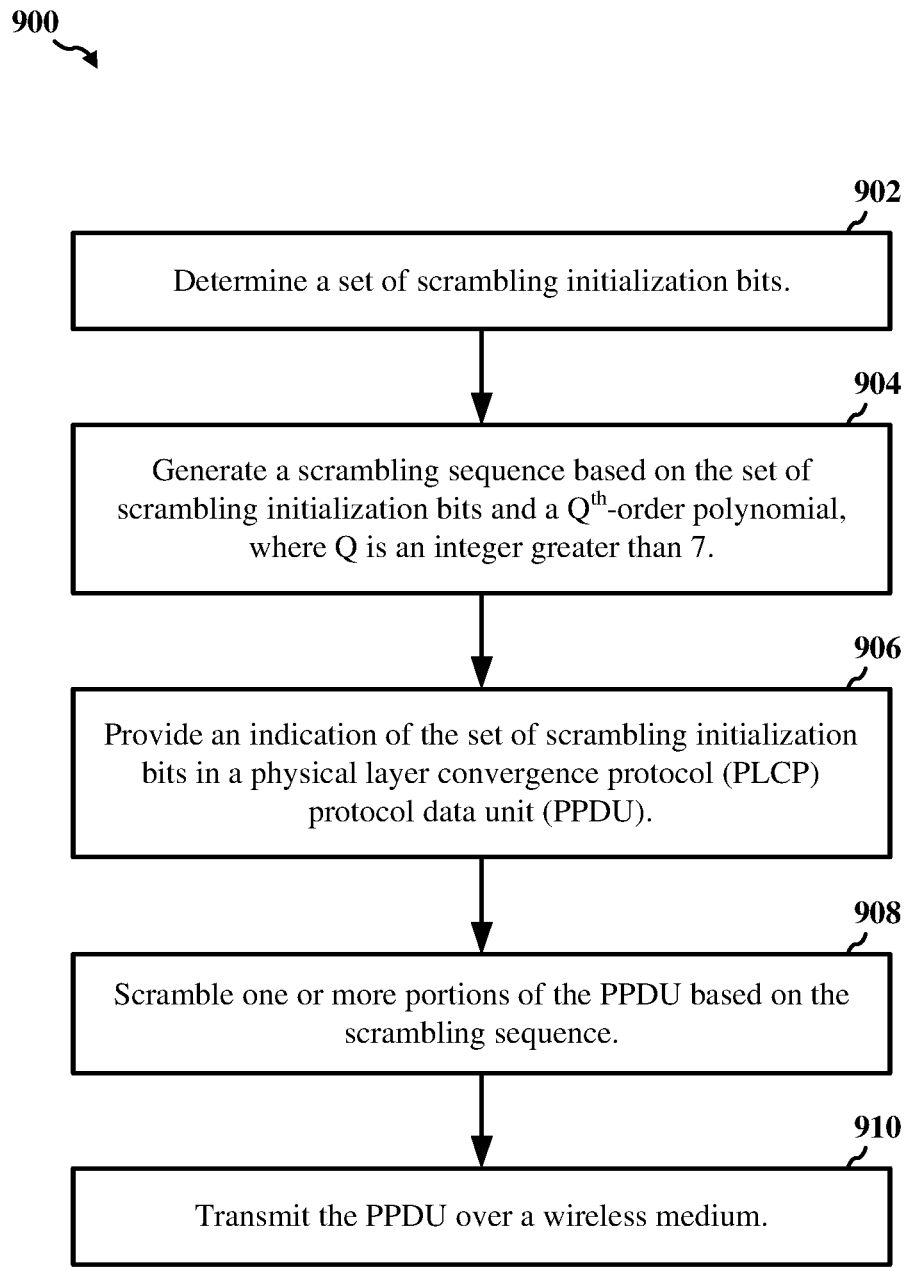
FIG. 9 shows a flowchart illustrating an example process for wireless communication by a transmitting device that supports scrambling PPDUs for transmission based on a $Q^{th}$-order polynomial according to some implementations.

FIG. 9 shows a flowchart illustrating an example process 900 for wireless communication by a transmitting device that supports scrambling PPDUs for transmission based on a $Q^{th}$-order polynomial according to some implementations. In some implementations, the process 900 may be performed by a wireless communication device operating as or within an AP, such as one of the APs 102 or 602 described above with reference to FIGS. 1 and 6A respectively. In some other implementations, the process 1100 may be performed by a wireless communication device operating as or within a network node, such as one of the STAs 104 or 604 described above with reference to FIGS. 1 and 6B, respectively.

In some implementations, the process 900 begins in block 902 with determining a set of scrambling initialization bits. In block 904, the process 900 proceeds with generating a scrambling sequence based on the set of scrambling initialization bits and a Qth-order polynomial, where Q is an integer greater than 7. In block 906, the process 900 proceeds with providing an indication of the set of scrambling initialization bits in a physical layer convergence protocol (PLCP) protocol data unit (PPDU). In block 908, the process 900 proceeds with scrambling one or more portions of the PPDU based on the scrambling sequence. In block 910, the process 900 proceeds with transmitting the PPDU over a wireless medium. In some implementations, the polynomial is an $11^{th}$-order polynomial, and the set of scrambling initialization bits consists of 11 bits.

Figure 10:
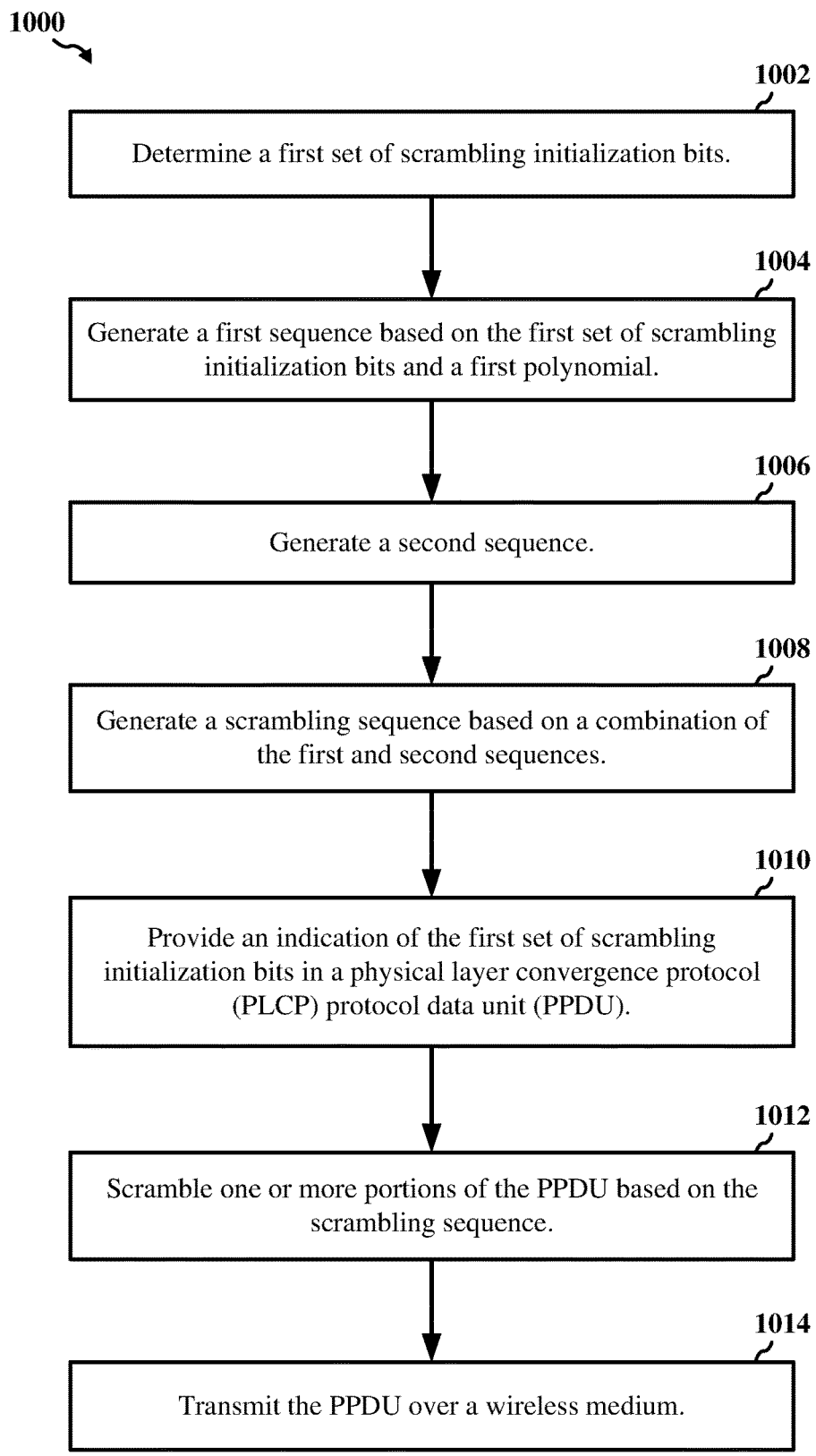
FIG. 10 shows a flowchart illustrating an example process for wireless communication by a transmitting device that supports scrambling PPDUs for transmission based on combining first and second sequences to generate a scrambling sequence according to some implementations.

FIG. 10 shows a flowchart illustrating an example process 1000 for wireless communication by a transmitting device that supports scrambling PPDUs for transmission based on combining first and second sequences to generate a scrambling sequence according to some implementations. In some implementations, the process 1000 may be performed by a wireless communication device operating as or within an AP, such as one of the APs 102 or 602 described above with reference to FIGS. 1 and 6A respectively. In some other implementations, the process 1000 may be performed by a wireless communication device operating as or within a network node, such as one of the STAs 104 or 604 described above with reference to FIGS. 1 and 6B, respectively.

In some implementations, the process 1000 begins in block 1002 with determining a first set of scrambling initialization bits. In block 1004, the process 1000 proceeds with generating a first sequence based on the first set of scrambling initialization bits and a first polynomial. In block 1006, the process 1000 proceeds with generating a second sequence. In block 1008, the process 1000 proceeds with generating a scrambling sequence based on a combination of the first and second sequences. In block 1010, the process 1000 proceeds with providing an indication of the first set of scrambling initialization bits in a physical layer convergence protocol (PLCP) protocol data unit (PPDU). In block 1012, the process 1000 proceeds with scrambling one or more portions of the PPDU based on the scrambling sequence. In block 1014, the process 1000 proceeds with transmitting the PPDU over a wireless medium.

Figure 11A:
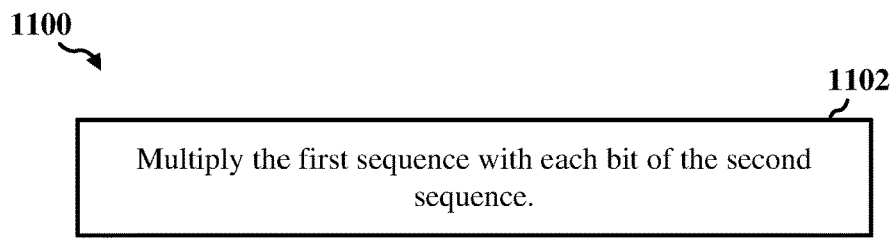
FIG. 11A shows a flowchart illustrating an example process for wireless communication by a transmitting device that supports generating a scrambling sequence based on multiplying a first sequence with each bit of a second sequence to according to some implementations.

FIG. 11A shows a flowchart illustrating an example process 1100 for wireless communication by a transmitting device that supports generating a scrambling sequence based on multiplying a first sequence with each bit of a second sequence to according to some implementations. In some implementations, the process 1100 may be performed by a wireless communication device operating as or within an AP, such as one of the APs 102 or 602 described above with reference to FIGS. 1 and 6A respectively. In some other implementations, the process 1100 may be performed by a wireless communication device operating as or within a network node, such as one of the STAs 104 or 604 described above with reference to FIGS. 1 and 6B, respectively.

In some implementations, the process 1100 begins after the process 1000 described with reference to FIG. 10. For example, the process 1100 may begin, in block 1102, after generating the scrambling sequence in block 1008 of the process 1000. In block 1102, the process 1100 begins with multiplying the first sequence with each bit of the second sequence.

Figure 11B:
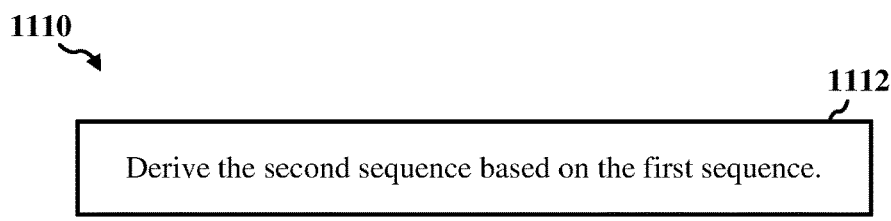
FIG. 11B shows a flowchart illustrating an example process for wireless communication by a transmitting device that supports generating a scrambling sequence based on a first sequence and a second sequence derived from the first sequence according to some implementations.

FIG. 11B shows a flowchart illustrating an example process 1110 for wireless communication by a transmitting device that supports generating a scrambling sequence based on a first sequence and a second sequence derived from the first sequence according to some implementations. In some implementations, the process 1110 may be performed by a wireless communication device operating as or within an AP, such as one of the APs 102 or 602 described above with reference to FIGS. 1 and 6A respectively. In some other implementations, the process 1110 may be performed by a wireless communication device operating as or within a network node, such as one of the STAs 104 or 604 described above with reference to FIGS. 1 and 6B, respectively.

In some implementations, the process 1110 begins after the process 1000 described with reference to FIG. 10. For example, the process 1110 may begin, in block 1112, after generating the first sequence in block 1004 of the process 1000. In block 1112, the process 1110 begins with deriving the second sequence based on the first sequence.

Figure 11C:
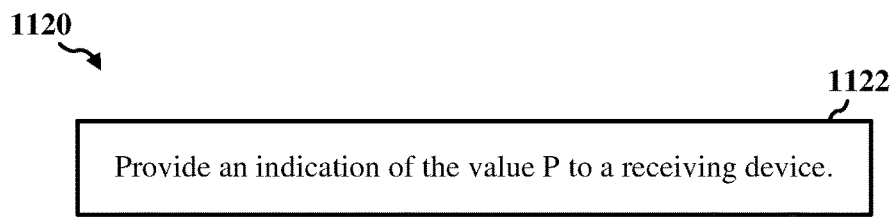
FIG. 11C shows a flowchart illustrating an example process for wireless communication by a transmitting device that supports indicating a scrambling sequence used to scramble PPDUs for transmission according to some implementations.

FIG. 11C shows a flowchart illustrating an example process 1120 for wireless communication by a transmitting device that supports indicating a scrambling sequence used to scramble PPDUs for transmission according to some implementations. In some implementations, the process 1120 may be performed by a wireless communication device operating as or within an AP, such as one of the APs 102 or 602 described above with reference to FIGS. 1 and 6A respectively. In some other implementations, the process 1120 may be performed by a wireless communication device operating as or within a network node, such as one of the STAs 104 or 604 described above with reference to FIGS. 1 and 6B, respectively.

In some implementations, the process 1120 begins after the process 1000 described with reference to FIG. 10. For example, the process 1120 may begin, in block 1122, after generating the second sequence in block 1006 of the process 1000. In block 1122, the process 1120 begins with providing an indication of the value P to a receiving device.

Figure 11D:
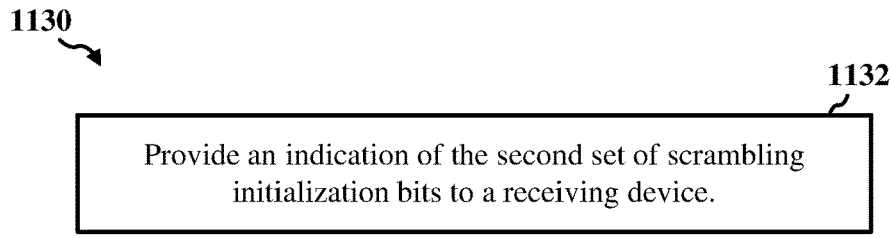
FIG. 11D shows a flowchart illustrating an example process for wireless communication by a transmitting device that supports indicating a scrambling sequence used to scramble PPDUs for transmission according to some other implementations.

FIG. 11D shows a flowchart illustrating an example process 1130 for wireless communication by a transmitting device that supports indicating a scrambling sequence used to scramble PPDUs for transmission according to some other implementations. In some implementations, the process 1130 may be performed by a wireless communication device operating as or within an AP, such as one of the APs 102 or 602 described above with reference to FIGS. 1 and 6A respectively. In some other implementations, the process 1130 may be performed by a wireless communication device operating as or within a network node, such as one of the STAs 104 or 604 described above with reference to FIGS. 1 and 6B, respectively.

In some implementations, the process 1130 begins after the process 1000 described with reference to FIG. 10. For example, the process 1130 may begin, in block 1132, after providing the indication of the first set of scrambling initialization bits in block 1010 of the process 1000. In block 1132, the process 1130 begins with providing an indication of the second set of scrambling initialization bits to a receiving device.

Figure 12:
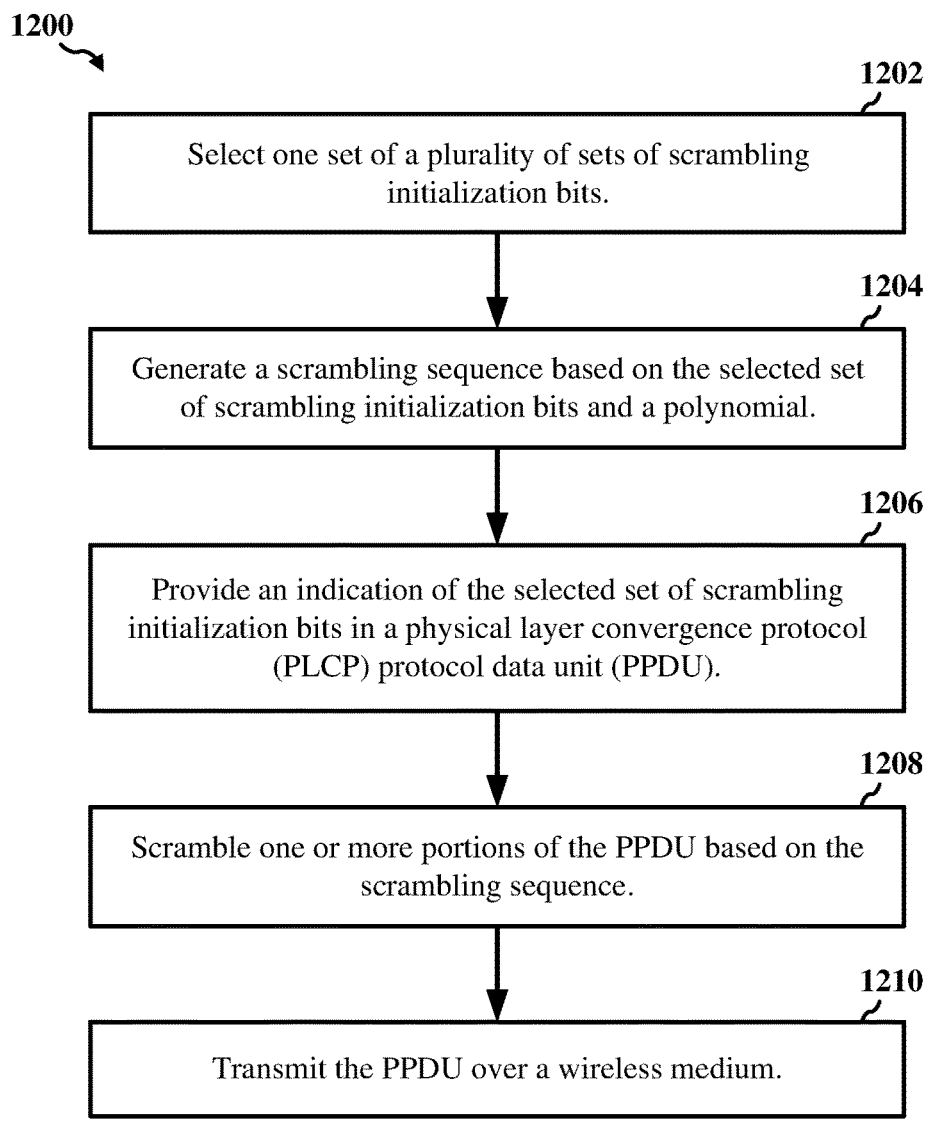
FIG. 12 shows a flowchart illustrating an example process for wireless communication by a transmitting device that supports scrambling PPDUs for transmission based on a selected set of scrambling initialization bits according to some implementations.

FIG. 12 shows a flowchart illustrating an example process 1200 for wireless communication by a transmitting device that supports scrambling PPDUs for transmission based on a selected set of scrambling initialization bits according to some implementations. In some implementations, the process 1200 may be performed by a wireless communication device operating as or within an AP, such as one of the APs 102 or 602 described above with reference to FIGS. 1 and 6A respectively. In some other implementations, the process 1200 may be performed by a wireless communication device operating as or within a network node, such as one of the STAs 104 or 604 described above with reference to FIGS. 1 and 6B, respectively.

In some implementations, the process 1200 begins in block 1202 with selecting one set of a plurality of sets of scrambling initialization bits. In block 1204, the process 1200 proceeds with generating a scrambling sequence based on the selected set of scrambling initialization bits and a polynomial. In block 1206, the process 1200 proceeds with providing an indication of the selected set of scrambling initialization bits in a physical layer convergence protocol (PLCP) protocol data unit (PPDU). In block 1208, the process 1200 proceeds with scrambling one or more portions of the PPDU based on the scrambling sequence. In block 1210, the process 1200 proceeds with transmitting the PPDU over a wireless medium.

Figure 13:
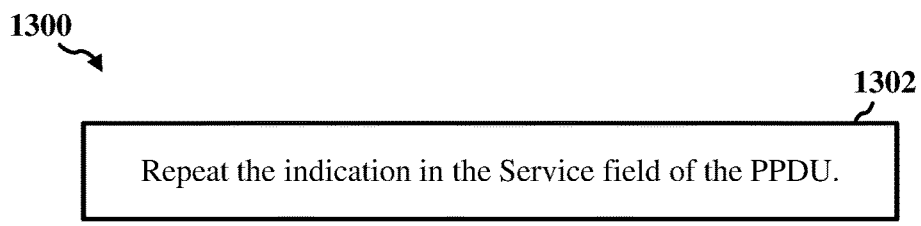
FIG. 13 shows a flowchart illustrating an example process for wireless communication by a transmitting device that supports generating a scrambling sequence based on a set of scrambling initialization bits and a selected function according to some implementations.

FIG. 13 shows a flowchart illustrating an example process 1300 for wireless communication by a transmitting device that supports generating a scrambling sequence based on a set of scrambling initialization bits and a selected function according to some implementations. In some implementations, the process 1300 may be performed by a wireless communication device operating as or within an AP, such as one of the APs 102 or 602 described above with reference to FIGS. 1 and 6A respectively. In some other implementations, the process 1300 may be performed by a wireless communication device operating as or within a network node, such as one of the STAs 104 or 604 described above with reference to FIGS. 1 and 6B, respectively.

In some implementations, the process 1300 begins after the process 1200 described with reference to FIG. 12. For example, the process 1300 may begin, in block 1302, after providing the indication in block 1206 of the process 1200. In block 1302, the process 1300 begins with repeating the indication in the Service field of the PPDU.

Figure 14:
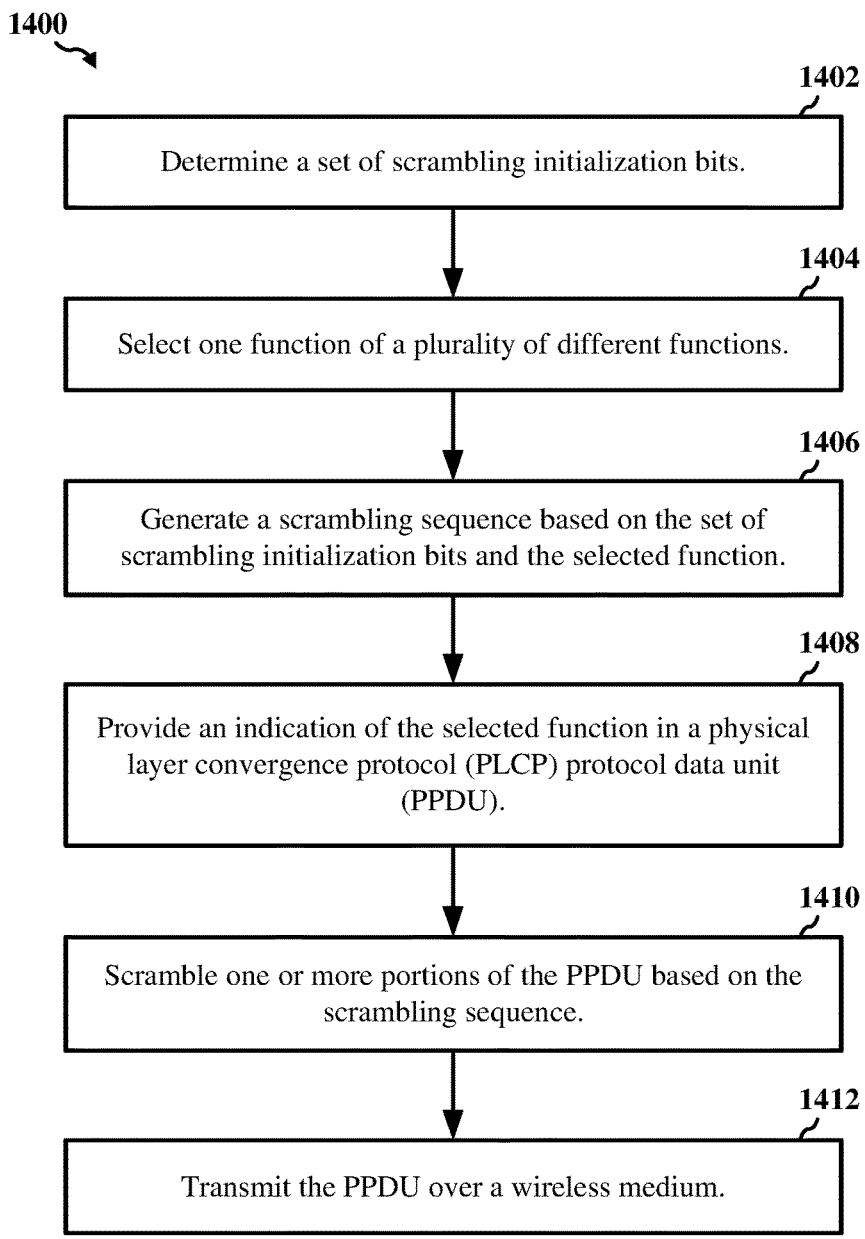
FIG. 14 shows a flowchart illustrating an example process for wireless communication by a transmitting device that supports indicating a scrambling sequence used to scramble PPDUs for transmission according to other implementations.

FIG. 14 shows a flowchart illustrating an example process 1400 for wireless communication by a transmitting device that supports indicating a scrambling sequence used to scramble PPDUs for transmission according to other implementations. In some implementations, the process 1400 may be performed by a wireless communication device operating as or within an AP, such as one of the APs 102 or 602 described above with reference to FIGS. 1 and 6A respectively. In some other implementations, the process 1400 may be performed by a wireless communication device operating as or within a network node, such as one of the STAs 104 or 604 described above with reference to FIGS. 1 and 6B, respectively.

In some implementations, the process 1400 begins in block 1402 with determining a set of scrambling initialization bits. In block 1404, the process 1400 proceeds with selecting one function of a plurality of different functions. In block 1406, the process 1400 proceeds with generating a scrambling sequence based on the set of scrambling initialization bits and the selected function. In block 1408, the process 1400 proceeds with providing an indication of the selected function in a physical layer convergence protocol (PLCP) protocol data unit (PPDU). In block 1410, the process 1400 proceeds with scrambling one or more portions of the PPDU based on the scrambling sequence. In block 1412, the process 1400 proceeds with transmitting the PPDU over a wireless medium.

Figure 15:
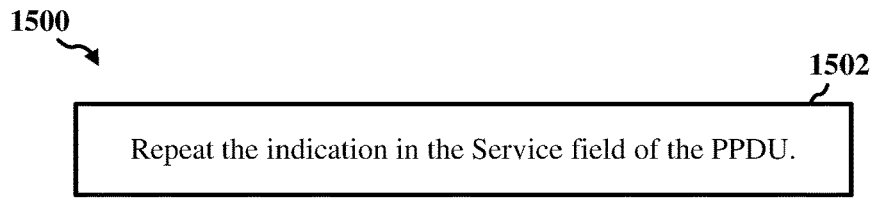
FIG. 15 shows a flowchart illustrating an example process for wireless communication by a transmitting device that supports indicating a scrambling sequence used to scramble PPDUs for transmission according to some other implementations.

FIG. 15 shows a flowchart illustrating an example process 1500 for wireless communication by a transmitting device that supports indicating a scrambling sequence used to scramble PPDUs for transmission according to some other implementations. In some implementations, the process 1500 may be performed by a wireless communication device operating as or within an AP, such as one of the APs 102 or 602 described above with reference to FIGS. 1 and 6A respectively. In some other implementations, the process 1500 may be performed by a wireless communication device operating as or within a network node, such as one of the STAs 104 or 604 described above with reference to FIGS. 1 and 6B, respectively.

In some implementations, the process 1500 begins after the process 1400 described with reference to FIG. 14. For example, the process 1500 may begin, in block 1502, after providing the indication in block 1408 of the process 1400. In block 1502, the process 1500 begins with repeating the indication in the Service field of the PPDU.

Implementation examples are described in the following numbered clauses:

1. A method for wireless communication performed by a transmitting device, the method including:
   determining a set of scrambling initialization bits;
   generating a scrambling sequence based on the set of scrambling initialization bits and an $11^{th}$-order polynomial;
   providing an indication of the set of scrambling initialization bits in a physical layer convergence protocol (PLCP) protocol data unit (PPDU);
   scrambling one or more portions of the PPDU based on the scrambling sequence; and
   transmitting the PPDU over a wireless medium.
2. The method of clause 1, where the indication is included in a Service field of the PPDU.
3. The method of any one or more of clauses 1-2, where the set of scrambling initialization bits is included in a Service field of the PPDU.
4. The method of any one or more of clauses 1-3, where the set of scrambling initialization bits consists of 11 bits.
5. The method of claim 4, where the 11 scrambling initialization bits are carried in the 11 Least Significant Bits (LSBs) of the Service field of the PPDU.
6. The method of any one or more of clauses 1-5, where at least a portion of the set of scrambling initialization bits is derived from a bit sequence included in one of a basic service set (BSS) color field of the PPDU, a signaling field of the PPDU, a version-independent field of the PPDU, a version-dependent field of the PPDU, or a user field of the PPDU.
7. The method of claim 6, where the version-independent field includes a Universal signaling field (U-SIG).
8. The method of claim 6, where the version-dependent field includes one of an extremely high-throughput (EHT) signaling field (EHT-SIG) or a Universal signaling field (U-SIG) of the PPDU.
9. A wireless communication device including:
   at least one modem;

at least one processor communicatively coupled with the at least one modem; and at least one memory communicatively coupled with the at least one processor and storing processor-readable code that, when executed by the at least one processor in conjunction with the at least one modem, is configured to:

determine a set of scrambling initialization bits;

generate a scrambling sequence based on the set of scrambling initialization bits and an $11^{th}$-order polynomial;

provide an indication of the set of scrambling initialization bits in a physical layer convergence protocol (PLCP) protocol data unit (PPDU);

scramble one or more portions of the PPDU based on the scrambling sequence; and transmit the PPDU over a wireless medium.

10. The wireless communication device of clause 9, where the indication is included in a Service field of the PPDU.

11. The wireless communication device of any one or more of clauses 9-10, where the set of scrambling initialization bits is included in a Service field of the PPDU.

12. The wireless communication device of any one or more of clauses 9-11, where the set of scrambling initialization bits consists of 11 bits.

13. The wireless communication device of clause 12, where the 11 scrambling initialization bits are carried in the 11 Least Significant Bits (LSBs) of the Service field of the PPDU.

14. The wireless communication device of any one or more of clauses 9-13, where at least a portion of the set of scrambling initialization bits is derived from a bit sequence included in one of a basic service set (BSS) color field of the PPDU, a signaling field of the PPDU, a version-independent field of the PPDU, a version-dependent field of the PPDU, or a user field of the PPDU.

15. The wireless communication device of clause 14, where the version-independent field includes a Universal signaling field (U-SIG).

16. The wireless communication device of clause 14, where the version-dependent field includes one of an extremely high-throughput (EHT) signaling field (EHT-SIG) or a Universal signaling field (U-SIG) of the PPDU.

17. The wireless communication device of clause 14, where the user field includes one or more user-specific fields of an extremely high-throughput (EHT) signaling field (EHT-SIG).

18. A method for wireless communication performed by a transmitting device, the method including:

selecting one set of a plurality of sets of scrambling initialization bits;

generating a scrambling sequence based on the selected set of scrambling initialization bits and a polynomial;

providing an indication of the selected set of scrambling initialization bits in a physical layer convergence protocol (PLCP) protocol data unit (PPDU);

scrambling one or more portions of the PPDU based on the scrambling sequence; and transmitting the PPDU over a wireless medium.

19. The method of clause 18, where the polynomial includes an $11^{th}$-order polynomial.

20. The method of any one or more of clauses 18-19, where the indication includes an index identifying the selected set of scrambling initialization bits.

21. The method of any one or more of clauses 18-20, further including repeating the indication in the Service field of the PPDU.

22. The method of any one or more of clauses 18-21, where each set of the plurality of sets of scrambling initialization bits consists of 11 bits.

23. The method of clause 22, where the 11 scrambling initialization bits are carried in the 11 Least Significant Bits (LSBs) of the Service field of the PPDU.

24. The method of any one or more of clauses 18-23, where at least a portion of each set of the plurality of sets of scrambling initialization bits is derived from a bit sequence included in a physical-layer (PHY) preamble of the PPDU.

25. A wireless communication device including:

at least one modem;

at least one processor communicatively coupled with the at least one modem; and at least one memory communicatively coupled with the at least one processor and storing processor-readable code that, when executed by the at least one processor in conjunction with the at least one modem, is configured to:

select one set of a plurality of sets of scrambling initialization bits;

generate a scrambling sequence based on the selected set of scrambling initialization bits and a polynomial;

provide an indication of the selected set of scrambling initialization bits in a physical layer convergence protocol (PLCP) protocol data unit (PPDU);

scramble one or more portions of the PPDU based on the scrambling sequence; and transmit the PPDU over a wireless medium.

26. The wireless communication device of clause 25, where the polynomial includes an $11^{th}$-order polynomial.

27. The wireless communication device of any one or more of clauses 25-26, where each set of the plurality of sets of scrambling initialization bits consists of 11 bits.

28. The wireless communication device of clause 27, where the 11 scrambling initialization bits are carried in the 11 Least Significant Bits (LSBs) of the Service field of the PPDU.

29. The wireless communication device of any one or more of clauses 25-28, where at least a portion of each set of the plurality of sets of scrambling initialization bits is derived from a bit sequence included in a physical-layer (PHY) preamble of the PPDU.

30. The wireless communication device of any one or more of clauses 25-29, where execution of the processor-readable code is further configured to:

repeat the indication in the Service field of the PPDU.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a transmitting device, the method comprising:
    determining a set of scrambling initialization bits;
    generating a scrambling sequence based on the set of scrambling initialization bits and an $11^{th}$-order polynomial;
    scrambling one or more portions of a physical layer convergence protocol (PLCP) protocol data unit (PPDU) based on the scrambling sequence; and
    transmitting the PPDU over a wireless medium.

2. The method of claim 1, wherein the scrambling sequence consists of 2047 bits.

3. The method of claim 1, wherein the set of scrambling initialization bits is included in a Service field of the PPDU.

4. The method of claim 1, wherein the set of scrambling initialization bits consists of 11 bits.

5. The method of claim 4, wherein the 11 scrambling initialization bits are carried in the 11 Least Significant Bits (LSBs) of the Service field of the PPDU.

6. The method of claim 1, wherein at least a portion of the set of scrambling initialization bits is derived from a bit sequence included in one of a basic service set (BSS) color field of the PPDU, a signaling field of the PPDU, a version-independent field of the PPDU, a version-dependent field of the PPDU, or a user field of the PPDU.

7. The method of claim 6, wherein the version-independent field comprises a Universal signaling field (U-SIG).

8. The method of claim 6, wherein the version-dependent field comprises one of an extremely high-throughput (EHT) signaling field (EHT-SIG) or a Universal signaling field (U-SIG) of the PPDU.

9. A wireless communication device comprising:
    at least one modem;
    at least one processor communicatively coupled with the at least one modem; and
    at least one memory communicatively coupled with the at least one processor and storing processor-readable code that, when executed by the at least one processor in conjunction with the at least one modem, is configured to:
        determine a set of scrambling initialization bits;
        generate a scrambling sequence based on the set of scrambling initialization bits and an $11^{th}$-order polynomial;
        scramble one or more portions of a physical layer convergence protocol (PLCP) protocol data unit (PPDU) based on the scrambling sequence; and
        transmit the PPDU over a wireless medium.

10. The wireless communication device of claim 9, wherein the scrambling sequence consists of 2047 bits.

11. The wireless communication device of claim 9, wherein the set of scrambling initialization bits is included in a Service field of the PPDU.

12. The wireless communication device of claim 9, wherein the set of scrambling initialization bits consists of 11 bits.

13. The wireless communication device of claim 12, wherein the 11 scrambling initialization bits are carried in the 11 Least Significant Bits (LSBs) of the Service field of the PPDU.

14. The wireless communication device of claim 9, wherein at least a portion of the set of scrambling initialization bits is derived from a bit sequence included in one of a basic service set (BSS) color field of the PPDU, a signaling field of the PPDU, a version-independent field of the PPDU, a version-dependent field of the PPDU, or a user field of the PPDU.

15. The wireless communication device of claim 14, wherein the version-independent field comprises a Universal signaling field (U-SIG).

16. The wireless communication device of claim 14, wherein the version-dependent field comprises one of an extremely high-throughput (EHT) signaling field (EHT-SIG) or a Universal signaling field (U-SIG) of the PPDU.

17. The wireless communication device of claim 14, wherein the user field comprises one or more user-specific fields of an extremely high-throughput (EHT) signaling field (EHT-SIG).

18. A method for wireless communication performed by a transmitting device, the method comprising:
- selecting one set of a plurality of sets of scrambling initialization bits;
- generating a scrambling sequence based on the selected set of scrambling initialization bits and a polynomial;
- providing an indication of the selected set of scrambling initialization bits in a physical layer convergence protocol (PLCP) protocol data unit (PPDU);
- scrambling one or more portions of the PPDU based on the scrambling sequence; and
- transmitting the PPDU over a wireless medium.

19. The method of claim 18, wherein the polynomial comprises an $11^{th}$-order polynomial.

20. The method of claim 18, wherein the indication comprises an index identifying the selected set of scrambling initialization bits.

21. The method of claim 18, further comprising repeating the indication in the Service field of the PPDU.

22. The method of claim 18, wherein each set of the plurality of sets of scrambling initialization bits consists of 11 bits.

23. The method of claim 22, wherein the 11 scrambling initialization bits are carried in the 11 Least Significant Bits (LSBs) of the Service field of the PPDU.

24. The method of claim 18, wherein at least a portion of each set of the plurality of sets of scrambling initialization bits is derived from a bit sequence included in a physical-layer (PHY) preamble of the PPDU.

25. A wireless communication device comprising:
- at least one modem;
- at least one processor communicatively coupled with the at least one modem; and
- at least one memory communicatively coupled with the at least one processor and storing processor-readable code that, when executed by the at least one processor in conjunction with the at least one modem, is configured to:
  - select one set of a plurality of sets of scrambling initialization bits;
  - generate a scrambling sequence based on the selected set of scrambling initialization bits and a polynomial;
  - provide an indication of the selected set of scrambling initialization bits in a physical layer convergence protocol (PLCP) protocol data unit (PPDU);
  - scramble one or more portions of the PPDU based on the scrambling sequence; and
  - transmit the PPDU over a wireless medium.

26. The wireless communication device of claim 25, wherein the polynomial comprises an $11^{th}$-order polynomial.

27. The wireless communication device of claim 25, wherein each set of the plurality of sets of scrambling initialization bits consists of 11 bits.

28. The wireless communication device of claim 27, wherein the 11 scrambling initialization bits are carried in the 11 Least Significant Bits (LSBs) of the Service field of the PPDU.

29. The wireless communication device of claim 25, wherein at least a portion of each set of the plurality of sets of scrambling initialization bits is derived from a bit sequence included in a physical-layer (PHY) preamble of the PPDU.

30. The wireless communication device of claim 25, wherein execution of the processor-readable code is further configured to:
- repeat the indication in the Service field of the PPDU.

* * * * *